(12) United States Patent
Bahadirlar et al.

(10) Patent No.: US 10,753,791 B2
(45) Date of Patent: Aug. 25, 2020

(54) DUAL-CHANNEL LASER AUDIO MONITORING SYSTEM

(71) Applicant: TUBITAK, Ankara (TR)

(72) Inventors: Yildirim Bahadirlar, Kocaeli (TR); Emin Çağatay Güler, Kocaeli (TR); Selami Şahin, Kocaeli (TR); Muhsin Eralp, Kocaeli (TR); Kamer Kayaer, Kocaeli (TR); Cenk Eryilmaz, Kocaeli (TR)

(73) Assignee: TUBITAK, Ankara (TR)

( * ) Notice: Subject to any disclaimer, the term of this patent is extended or adjusted under 35 U.S.C. 154(b) by 201 days.

(21) Appl. No.: 16/073,333

(22) PCT Filed: Jan. 26, 2016

(86) PCT No.: PCT/IB2016/050376
§ 371 (c)(1),
(2) Date: Jul. 26, 2018

(87) PCT Pub. No.: WO2017/130021
PCT Pub. Date: Aug. 3, 2017

(65) Prior Publication Data
US 2019/0041258 A1    Feb. 7, 2019

(51) Int. Cl.
*G01H 9/00* (2006.01)
*H04R 23/00* (2006.01)
*G01B 9/02* (2006.01)

(52) U.S. Cl.
CPC ......... *G01H 9/004* (2013.01); *G01B 9/02003* (2013.01); *G01B 9/02028* (2013.01);
(Continued)

(58) Field of Classification Search
CPC ........ G01H 9/04; G01H 9/00; G01B 9/02003; G01B 9/02028; G01B 9/02045;
(Continued)

(56) References Cited

U.S. PATENT DOCUMENTS 4,115,753 A * 9/1978 Shajenko ............... G01H 9/006
340/854.7
5,121,248 A * 6/1992 Mohon ................... G06E 3/005
359/285
(Continued)

FOREIGN PATENT DOCUMENTS

WO    9315386 A1    8/1993

OTHER PUBLICATIONS

Anonymous, Making vibrations Visible, Jul. 1, 2013, pp. 1-8, Retrieved from the Internet: URL: http://web.archive.org/web/20130701043648/http://www.polytec.com/filradmin/user_uploads/ProductVibrometers/PSV-400/Documents/OM_BR_PSV_2010_07_PDF_E.pdf.

*Primary Examiner* — Xu Mei
(74) *Attorney, Agent, or Firm* — Bayramoglu Law Offices LLC

(57) ABSTRACT

A multi-channel remote audio monitoring device based on a heterodyne interferometric laser Doppler vibrometer. The multi-channel remote audio monitoring device transmits two invisible laser beams to a reflecting surface being vibrated by sound sources in the proximity. Reflected beams constituting two channels are then received back and converted into audible signals for on-line listening and on-line storing. Aforementioned signals can also be processed for on-line noise reduction purposes through a graphical user interface and a filtering module.

21 Claims, 9 Drawing Sheets

(52) U.S. Cl.
CPC .......... *G01B 9/02045* (2013.01); *G01H 9/00*
(2013.01); *H04R 23/008* (2013.01)

(58) Field of Classification Search
CPC ...... H04R 23/00; H04R 23/008; H04R 29/00;
H04R 29/001; H04R 29/002; H04R 29/008
USPC .................... 381/56, 58, 59, 77, 79, 80, 160
See application file for complete search history.

(56) References Cited

U.S. PATENT DOCUMENTS

| | | | |
|---|---|---|---|
| 5,394,233 A | 2/1995 | Wang | |
| 5,694,216 A | 12/1997 | Riza | |
| 6,271,924 B1 | 8/2001 | Ngoi et al. | |
| 7,190,635 B1 * | 3/2007 | Killinger | G01S 17/86 367/128 |
| 7,845,233 B2 * | 12/2010 | Seagrave | H04R 3/005 381/303 |
| 8,559,654 B2 * | 10/2013 | Houg | H04S 7/303 381/107 |
| 8,991,062 B2 * | 3/2015 | Atkinson | G01B 11/26 33/263 |
| 9,913,054 B2 * | 3/2018 | Beaty | H04S 7/40 |
| 10,429,171 B2 * | 10/2019 | Vyacheslav | G01B 9/02019 |
| 2005/0012935 A1 | 1/2005 | Kersey | |
| 2005/0237533 A1 | 10/2005 | Lal et al. | |
| 2007/0133351 A1 | 6/2007 | Taylor | |
| 2014/0009750 A1 * | 1/2014 | Schussler | G01P 3/36 356/28.5 |
| 2014/0347670 A1 | 11/2014 | Wortge et al. | |

* cited by examiner

DUAL-CHANNEL LASER AUDIO MONITORING SYSTEM

CROSS REFERENCE TO RELATED APPLICATIONS

This application is the national phase entry of International Application No. PCT/IB2016/050376, filed on Jan. 26, 2016, the entire contents of which are incorporated herein by reference.

TECHNICAL FIELD

This invention relates to a multi-channel device and methods for remote and non-contact sensing of audio signals from a reflecting surface of a target object, especially speech, via a heterodyne, interferometric laser Doppler vibrometer and also to single and dual channel signal processing methods for reducing noise contaminated to acquired audio signals. Therefore this invention is about a device embodying components for, remote, non-contact, non-destructive, non-invasive sensing, filtering and storing of audio signals from a remote location.

BACKGROUND

Laser Doppler Vibrometry (LDV) is a well-known non-contact method to measure vibrations or velocity on the surface of a target object. Non-contact measurement of surface velocity can be done using an optical interference method and sensing the Doppler shift of reflected light from a target object. If the target vibration is to be measured, the reflected light picks up a spectrum of sidebands from the range of vibrational frequencies at the target.

Laser Doppler Vibrometer based measurement devices have been widely used in various applications including medicine such as blood flow measuring, customs examination of suspicious vehicles, distant examination of large structures such as buildings, viaducts, bridges, pipes or cores of nuclear power plants, remote listening of facilities for surveillance purposes, land mine detection, diagnosis of fresco paintings. Therefore, LDVs have proven to be useful in a wide variety of applications and technological fields for non-contact, non-destructive, non-invasive evaluation of various structures.

Laser Doppler Vibrometers are optical devices utilizing two coherent laser beams from a single laser source: one as a probe beam and the other is a reference beam. Probe beam is used to illuminate a point on a reflecting target object. Light reflected and/or scattered back is captured to be optically interfered with reference beam so that an interference signal is obtained which represents a Doppler shift in the reflected probe beam. This interference signal is then used to extract the velocity and displacement, i.e. vibration, information of the point on the target object surface. Such a system mainly comprises of a Bragg Cell, photodetector, demodulator and filtering modules in order to achieve the goal of converting reflected laser beam into a baseband analog signal.

Generally, the preferred method of laser Doppler vibrometry shifts the sensor's time varying signals to a higher frequency to eliminate velocity directional ambiguity and to lessen the additional electronic noise typically found near zero frequency (DC). Many commercially available LDVs accomplish this by using an optical frequency offset in a frequency-shifted self-heterodyne (or offset homodyne) detection method. Typically, this offset is provided by putting the reference optical beam through an acousto-optic modulator (AOM) crystal to shift the optical carrier frequency. When this reference beam is combined with the reflected beam from the target onto a photodiode, the time-varying heterodyne signal containing the target's vibrational modulation is centered about this intermediate frequency offset. Usually, to obey the physical constraints of the AOM, this frequency is tens of MHz or higher. Often, this high intermediate frequency is electrically mixed to yet lower frequencies for subsequent frequency demodulation, in order to extract the target's vibrational velocity spectrum. To avoid electrical down-conversion, and to obtain a smaller frequency offset, sometimes two AOMs are used in tandem, with large opposite shifts at a differential frequency. Usually such vibrometers use free-space optical beams or more compact forms of fiber coupled systems.

There are two interferometric methods conventionally used for LDV applications: homodyne detection and heterodyne detection. The heterodyne detection method using frequency shifting techniques overcomes a number of drawbacks inherent in homodyne detection.

Devices comprising a single-beam LDV system in concert with a beam scanning system have also been developed. Scanned single-beam techniques are suitable for measuring vibrations that are repetitive (e.g., continuously cycling over the same location); however, because the measurements are made sequentially from one location to the next, the value of this technique is limited when the vibrations are transient or non-repetitive or have continuous components comprising relatively high wide band-width. Measurement of non-repetitive vibrations is important when analyzing civil structures, aerospace composite components, and for buried land mine detection. While a plurality of single-beam LDV systems could be used to measure multiple locations on an object, this would be a costly and complicated option if a large number of simultaneous measurements were required.

Simultaneous measurement of multiple locations on an object is needed in order to gain more complete information on an object's vibrational characteristics. Specifically, simultaneous LDV measurements yield: (a) phase information among the measured points, (b) increased inspection speed, and (c) the ability to measure non-repetitive vibration patterns. A simultaneous multi-beam LDV system based on a homodyne interferometer design has also been investigated. However, because that multi-beam technique is based on a homodyne detection method, it is affected by the same performance limitations as the single-beam homodyne system described above.

In view of the foregoing, there is a need in the art for an LDV device that can simultaneously measure multiple locations on an object with the benefits of high signal-to-noise ratio, wide dynamic range, and high accuracy inherent with heterodyne detection.

Devices and methods are developed for remotely detecting sounds using laser Doppler vibrometers. These devices direct a laser probe beam at a point on a reflecting surface to acquire sounds in the proximity. Speech signals and other acoustical signals at the target space cause reflecting surface to vibrate. This vibration modulates the reflected probe beam in accordance with the Doppler Effect. Total acoustical signal is then obtained by the laser Doppler vibrometer, i.e., interference signal is converted into an analog electrical signal, demodulated and filtered to extract sound signals. If the device is used for eavesdropping purposes probe beam is preferred to be invisible and reflecting surface is usually a window glass in a target room. Although such devices are given different names as laser-bounce listening devices, remote laser voice-detection systems etc., they are usually called as laser listening devices.

Laser listening devices are advantageous over microphones. Such a device can be directed at reflecting surfaces in the proximity of sound sources under surveillance from hundreds of meters while microphones are required to be placed in the monitored space. Laser listening devices can avail the surveillance of a facility with adequate intelligibility of speech and even when a comprehensible speech cannot be acquired, an essence of the matter, e.g., number, genders of persons, can be understood without access to the monitored space.

In general, main drawback of laser listening devices arises from the vibrating properties of target surfaces. Sound sources in a monitored space generate vibrations on the surface of an object; therefore, the surface itself acts as a transducer. Hence, an analogy can be drawn between the surface and a microphone, but contrary to a microphone membrane, vibrating properties of a relatively large target surface is modal or inhomogeneous. In other words, whole surface or points on it do not tend to exhibit flat transfer functions in contrast to microphones. Furthermore, target objects with higher dimensions and larger mass have poor vibration properties causing degradation of the signal integrity to be monitored. Each point on surface carries different vibration information of the signal around the vicinity and lacking information (a frequency component) in one point may exhibit itself in another. Therefore, it is always beneficial to acquire signals from multiple points on a surface to be able to defragment information. Laser listening devices which avail monitoring from multiple points by scanning a target surface require separate detectors and/or very fast CCD cameras which make the prior art expensive and complicated.

Another potential problem for laser Doppler vibrometers as listening devices is the background noise: background noise originating from machines and other sources around the vicinity cause vibrations on the surface resulting in contamination of signals under surveillance. Consequently, extracting audible signals through a laser listening device with a single probe beam directed at a single point may become a highly challenging task due to poorly vibrating target surfaces and background noises. On the other hand, noise problem can be overcome to some extent by applying various online/offline signal processing methods as filtering.

It would be therefore desirable to have relatively cost effective and simple device and methods that allows monitoring sounds from multiple points on a reflecting target surface. It would also be beneficial taking the advantage of having plurality of signals to be able to apply advanced and multi-channel noise reduction or signal separation techniques as blind source separation, active noise cancellation or even Wiener filtering.

SUMMARY

This invention relates to a heterodyne dual-channel laser Doppler vibrometer that simultaneously measures displacement or velocity of two point locations on a target object or two different objects. Simultaneous heterodyne measurement of multiple locations provides a highly accurate measurement of an object's vibrational characteristics. The present invention is also related to the interferometric measurement of vibration at two distinct locations on a remotely located object using two beams of coherent radiation. This invention also presents a portable multi-channel laser audio monitoring device that enables two-channel simultaneous on-line listening, on-line noise reduction and signal separation filtering and on-line storing of sounds generating vibrations in the proximity of a reflecting object.

According to one aspect of the invention, the optical module generates a plurality of probe beams and a plurality of frequency-shifted reference beams. The plurality of frequency-shifted reference beams have a frequency that is shifted from a frequency of the plurality of probe beams. The probe beams are then transmitted to an object. A portion of each of the probe beams is reflected off the object as a modulated probe beam. The modulated probe beams are then collected by the optical module. The combining element combines each of the modulated probe beams with a respective one of the frequency-shifted reference beams into a plurality of beam pairs. The beam pairs may then be processed to determine characteristics of the object.

According to another aspect of the invention, aforementioned determination of characteristics of the object or sound monitoring from the surface of the object tasks are achieved by directing two coherent invisible object laser beams at two different points on a surface of a single object or two different surfaces of different objects with a single laser source heterodyne interferometric laser Doppler vibrometer. Therefore, one of the advantages of the invention is that the vibrometer is able to simultaneous measure velocity or displacement of an object over two distinct points on target object. The heterodyne technique utilized by the vibrometer enables measurements near zero frequency with excellent fidelity. Measurements made by the vibrometer of the invention are characterized by high signal-to-noise ratio, wide dynamic range, and simple alignment. The system can utilize a computer with software for computing and displaying the velocity and/or amplitude history of all of the measured points of the object. Speech signals and other acoustical signals in the target space cause the object/objects to vibrate and these vibrations modulate the reflected beams in accordance with the Doppler Effect. Two reflected probe beams are then interfered with relevant reference beams. Interference beams are utilized to obtain two audible signals representing sounds around the vicinity. Extraction of an audible signal from an interference beam is a crucial task for the device of this invention. This task is achieved by using a Bragg Cell, photodetector and an electronic demodulator. The interference beam can yield a frequency modulated signal at the carrier frequency of the reference beam, i.e., frequency shifted by the Bragg Cell, with the frequency deviation occurred within the reflected probe beam caused by displacements on the reflecting surface. However, the frequency deviation is much smaller than the carrier frequency of the frequency modulated signal. This deviation depends on wavelength of the laser beam, displacement of the surface and the frequency of the sound signal. In order to cope with the problem of extracting extremely small frequency deviations forming the sound signal from the frequency modulated signal, a demodulator with a local oscillator having high carrier to noise ratio and with accurate temperature compensation characteristics as well as a laser source with very small linewidth are used in the device.

The device comprises two units, a transducer unit and a control unit, as shown in FIG. 1. There exist a battery, control and DSP processors, demodulators and analog filters, and a data storage device, e.g., hard disk drive, solid-state drive, SD card, etc., inside the control unit. All device operations, as start/stop, monitoring, storing, and function adjustments as the noise reduction filter parameters settings, are executed and controlled through a graphical user interface on the control unit. Control unit has the line out interface to listen to sounds via headphones or loudspeakers. An auxiliary interface on the control unit is a USB port, which facilitates retrieving recorded and stored signals from the internal data storage device. Transducer unit, as a system complement on the other hand, includes the laser source, optical elements, lenses, i.e., optical components of two-channel laser Doppler vibrometer. Two lenses on transducer unit separately transmit and receive two probe beams directed at reflecting surfaces. Each of the two telescopes over two lenses are used to align the relevant probe laser beam to hit the vibrating object accurately. Each of the two led bar graphs on the transducer unit indicates the amount of intensity of relevant interfering beam composing of the intensities of reference beam and probe beam reflected back from the target point. Thus, a fully lit led bar graph indicates that the reflected probe beam exactly interferes with reference beam and composes a strong interfering beam. Consequently, appropriate intensity is obtained to extract audible signals by electronic demodulation.

Transducer unit is placed on a supporting system comprising a tripod and adjustable plates. Main task of the supporting system is to keep the transducer unit stable. Another important task and feature of the supporting system is to facilitate coarse and fine adjustments of the perpendicularity of object laser beams to reflecting surfaces. The coarse adjustments for two probe beams can be enabled by the tripod's pan and tilt handles. A fine adjustment of each beam is also achieved by the separate adjustable plates placed on the tripod and transducer unit. Hence, each lens has its own fine adjustable pan and tilt handles. A strict perpendicularity of each of the two probe beams to the relevant remote surface can be adjusted standalone after the coarse adjustment via tripod handles is completed. Another task of the supporting system is to reduce transducer unit shake arising from external factors such as ground vibrations. This task is achieved by shock absorbers installed between the transducer unit and the supporting system. The space between two probe beams is also adjustable. In other words, the distance between two lenses or, equivalently, interval between two probe beams can be varied. This is accomplished by placing the right lens on a stepwise sliding unit, which can be moved along the x-axis while keeping the left lens in a fixed position. The purpose of changing the distance between probe beams is to avail the operator of the possibility of seeking a point on the reflecting surface, which yields better quality for sounds under surveillance. Moreover, adjustable/variable distance between probe beams provides the opportunity of searching for the optimum point on the surface where the sound obtained from that point becomes, to some extent, distinct from the sound obtained from the other point. For example, one can adjust the position of the right probe beam such that background noise is more evident while sounds of interest are more apparent on the other point due to proximity of sound sources to the points as well as the different vibration properties of points on the surface. Therefore, multi-channel/multi-sensor based noise reduction filtering or signal separation algorithms can be applied with a greater efficiency.

In summary, the flow of operation of the device is as follows: operator turns the device on, perpendicularity of two probe beams to remote vibrating objects are aligned through two telescopes over two lenses and the supporting system, a noise reduction filter is selected and parameters of the filter are adjusted through the graphical user interface, subsequently remote listening starts. During remote listening, raw and filtered sounds are encrypted and recorded to the internal data storage device, e.g., hard disk drive, until the operation is stopped through the graphical user interface.

First advantage of the invention to prior art is to present two-channel sound signals which can be handled separately or simultaneously for monitoring. The contribution here is to obtain two channels, i.e., two reference beams and two probe beams from a single laser source.

Second advantage of the invention to prior art is to have two-channel sound signals which can be listened on-line, separately or simultaneously depending upon operator's choice. This multi-channel listening option is important for two reasons; (a) surfaces usually do not have perfect vibration properties because of their masses and dimensions causing degradation in sound quality, consequently single channel listening may not be adequate for obtaining an intelligible sound while two-channel listening may be more effective in terms of intelligibility due to complementary spatial effects of channels on each other, (b) if a measurement cannot be taken from one of the channels for some reason like malfunctioning or temporal or permanent lack of line of sight, the other channel can still be utilized for listening purposes.

Third advantage of the invention is to present different filtering options to process two-channel signals separately or simultaneously for noise reduction or signal separation purposes. Conventional filters like high-pass filters are applied to one or both channels separately, or adaptive filters like cross-talk active noise cancellers utilizing information from dual channels to extract sound signal of interest are used. Contribution of the present invention to prior art from signal processing point of view is to provide noise reduction and signal separation techniques which make the use of signals from two channels. In other words, considering two channels as two different sensors measuring desired sounds and unwanted noise in a vicinity, multi-channel noise reduction algorithms are presented to the operator through a graphical user interface. Those skilled in art will discern that the usage of multi-channel noise reduction or signal separation algorithms is the first in laser Doppler based listening devices.

Fourth advantage of the invention is to present a versatile graphical user interface, which facilitates controlling the operation of the device and utilization of device features with ease of use. The graphical user interface is unique in prior art in the sense of its menu organization and controlling the device features. Main features of the device which are executed and controlled through the graphical user interface are; (a) the encryption and storing of the two-channel raw input and the two-channel filtered output sound data to an internal data storage device automatically while monitoring (listening), (b) filtration of the two-channel raw sound signal input on-line by the embedded filters to enhance the output sound, (c) filter selection and adjustment of the filter parameters, (d) saving an adjusted filter as a favorite filter under a name given by the user, (e) loading and running a previously saved favorite filter, (f) selecting the first channel, the second channel or the two-channel stereo output data for monitoring (listening), (g) transferring any saved sound data to an external data storage device with encryption that the encryption key is given by the user, (h) adjustment of the system settings like the output volume, the input volume, the brightness of the screen, the laser power and the laser on/off state, (i) giving information about the date and time, the system settings, the condition of the laser and the battery.

Fifth advantage of the invention is to present two different power supply options for the operation of the device; one is a rechargeable battery and the other is to supply power through the line voltage. Therefore, it is obvious that the device has the advantage of operating in the lack of line voltage. A further advantage of operating the device with batteries is the ease of portability. Batteries and power supply circuits are inside the control unit housing. The remaining capacity and the charging state of the battery are monitored by the GUI. If there is not enough battery capacity left for the operation of the system, system shuts down automatically with no data corruption or lose in the recorded sound data.

Other features and advantages of the present invention will become evident to those skilled in the art with the following detailed description and accompanying drawings.

BRIEF DESCRIPTION OF THE DRAWINGS

The above summary, as well as the following detailed description of the invention, will be better understood when read in conjunction with the accompanying drawings. However, it should be taken into account that the invention is not limited to the explicit arrangements and instrumentalities illustrated.

DETAILED DESCRIPTION

It will be apparent to those skilled in the art, that is, to those who have knowledge or experience in this area of technology that many uses and design variations are possible for the laser Doppler vibrometer disclosed here. The following detailed description of various alternative and preferred characteristics and embodiments will demonstrate the general principles of the invention with reference to a laser Doppler vibrometer appropriate for utilization in measuring audible signals. Other embodiments of this disclosure suitable for other applications will be apparent to those skilled in the art.

Figure 1:
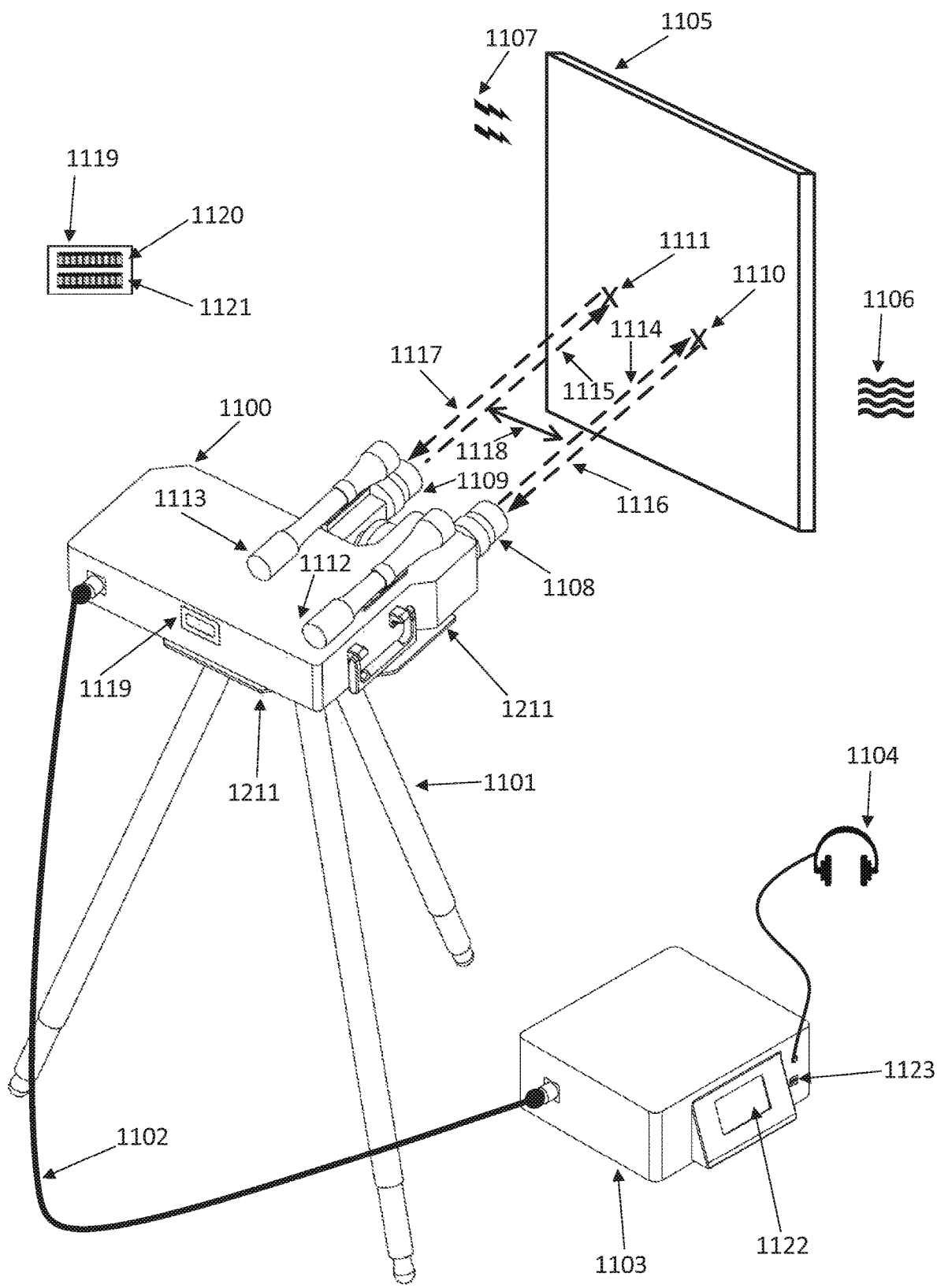
FIG. 1 is a perspective illustrative view of a complete configuration of a dual-channel laser audio monitoring system according to an embodiment of this invention.

An exemplary embodiment of a dual channel laser audio monitoring system is shown in FIG. 1. FIG. 1 as a general illustration shows a perspective view of a complete configuration of the dual-channel laser audio monitoring system (1100, 1101, 1102, 1103 and 1104), a target object (1105), and sound signal (1106) and noise (1107) sources impinging on the reflecting surface of the target object (1105). In the preferred embodiment, the dual-channel laser audio monitoring system (1100, 1101, 1102, 1103 and 1104) composes of a transducer unit (1100), a common commercial industrial type tripod (1101), an interface cable (1102), a control unit (1103) and stereo headphones (1104).

Referring to FIG. 1, two parallel probe beams (1114 and 1115) are sent from two lens system (1108 and 1109) and focused on the surface of the target object (1105), and returned reflected radiation (1116 and 1117) from the beams are collected through the same lens system (1108 and 1109) and transferred to an optical module (2000) placed inside the transducer unit (1100) for further processing to obtain audio signals.

The dual channel laser audio monitoring system may be configured as a vibration detection system of a polished target object (1105) which is depicted in FIG. 1. In these embodiments, the system may include the dual channel laser audio monitoring system (1100, 1101, 1102, 1103 and 1104), a target object (1105), a sound signal and noise source (1106 and 1107) such as a speaker near the target object (1105). Acoustic vibrations from the sound signal source send vibrations into the glass window. These acoustic waves will modulate the surface of the target object (1105). Target object (1105) may be a glass window. The transient and/or continuous vibrations of the target object (1105) may then be measured by the dual channel laser audio monitoring system to detect the sound vibrations and reconstruct the audio sound signal (1106) from the target scene through the use of electronics. In this embodiment, the probe beams are sent to glass and at a perpendicular or close to perpendicular angle (in case of a retro tape). The reflected beams (1116 and 1117) are detected by the optical module (2000). Optical module (2000) is one embodiment of an interferometer system wherein polarizing beam splitters (2105, 2110 and 2112) and quarter-wave plates (2111 and 2113) are used together to minimize the loss in retro-reflected signal. Probe beam (1114 or 1115), back-reflected probe beam (1116 or 1117) and reference beam (2203 or 2204) are coaxial and all spatially overlapped on the photodetector (2119 or 2120) and the beams are coaxially aligned using vertically adjustable mirror and beam splitter units (2112, 2115, 2110 and 2114). Laser (2101) of the optical module (2000) is a fiber laser operating at an eye-safe wavelength with long coherence length.

Firstly, the dual-channel laser audio monitoring system is configured for the operation by mounting the transducer unit (1100) on the tripod (1101) and by connecting the interface cable (1102) between the transducer unit (1100) and the control (1103) unit. The interface cable (1102) is a multi-purpose connection interface that includes multi-voltage power lines for the transducer unit (1100) and USB connection for the laser source (2101) installed within the transducer unit (1100). The interface cable (1102) also carries a modulating radio frequency RF signal to the Bragg Cell (2116) installed within the optical module (2000) inside the transducer unit (1100) and dual-channel radio frequency (RF) signals (2311 and 2312) to the demodulators located inside the control unit (1103).

After the setup of the dual-channel laser audio monitoring system (1100, 1101, 1102, 1103 and 1104), coarse adjustments of the left lens (1108) and the right lens (1109), according to the frontal view, are made to provide perpendicularities to the right measurement point (1110) and to the left measurement point (1111) on the reflecting surface of the target object (1105), respectively. Providing perpendicularity of a lens (1108 or 1109) to a measurement point (1110 or 1111) is accomplished by using the pan and tilt handles on the tripod (1101), and by observing the reflecting image of a telescope opening through the telescope (1112 or 1113) itself, and at the same time by seeking to align the article in a telescope to the image of the opening on the reflecting surface of the target object (1105). Telescopes (1112 and 1113) are exactly pre-aligned to the axes of the corresponding probe beams (1114 and 1115) in order to facilitate a required entry of the back reflecting probe beams (1116 and 1117) to the corresponding lenses (1108 and 1109). At this instant of the coarse adjustment, the interval (1118) between the two lenses (1108 and 1109) may also be fixed to an adequate distance by considering the horizontal dimension of the reflecting surface of the target object (1105) and with more experience by taking into account the type of the target object (1105) itself.

A fine adjustment epoch should be started after the coarse adjustment is completed. During this epoch, adjustment plates which are implemented between the tripod (1101) and the transducer unit (1100) are used. The use of adjustment plates (1210, 1211 and 1212) will be detailed in the description of FIG. 2. A light panel (1119) comprising two led bar graphs (1120 and 1121) on the back side of the transducer unit (1100) is used as assistive indicators of perpendicularity and of the interference levels obtained at a particular case, e.g., from a distant range or from a dirty or a partially scattering reflecting surface of the target object (1105). The upper led bar graph (1120) of the light panel (1119) presents the level of signal received from the left lens (1108) while the lower led bar graph (1121) shows the signal level from the right lens (1109) which is generally allocated as an auxiliary channel in the preferred embodiment of the invention. In the fine adjustment epoch, therefore, one may firstly seek for a good level of signal from the left lens (1108) and then secondly from the right lens (1109) up to getting an approximate level of signal to the one obtained from the left lens (1108). The fine adjustment epoch for the left lens (1108) and the right lens (1109) results in an almost equal level of RF signals from both lenses (1108 and 1109) to the demodulation block (3200) of the analog processing module (3000) shown in FIG. 4 and located inside the control unit (1103).

The analog processing module (3000) develops two baseband audible analog raw channel signals (3041 and 3042) from two frequency modulated RF signals (2311 and 2312). The two base-band audible analog raw channel signals (3041 and 3042) are then digitized and inputted to the filtering module (4000).

In general, the target object (1105) is a quite clean window glass or a material possessing a very shiny coating. The reflecting surface of the target object (1105) should also have adequate dimensions or surface area on which one or two probe beams (1114 and 1115) with suitable interval (1118) between them can be easily projected on the measurement points (1110 and 1111) by coarse and fine adjustments. Thickness of the target object (1105) is also essential and should be as thin as possible that a sound signal source (1106) under interest with a reasonable sound level can produce a displacement of the surface over a range that the system sensitivity is sufficient to provide a suitable intelligibility of the acquired two-channel signals. These constraints are not too limiting from an operational point of view of the system, and, for example, most of the windows in hand in applications can fulfill these surface property and dimensional requirements.

Locating the dual-channel laser audio monitoring system (1100, 1101, 1102, 1103 and 1104) with respect to the reflecting surface of the target object (1105) and to the sound signal and noise signal sources, 1106 and 1107, respectively, is an important issue also from the view points of the signal processing in general and of the noise reduction in particular.

As mentioned above the right lens (1109) can essentially serve as an auxiliary channel and, in principle, needs to have a measurement point (1111) close to a disturbing noise source (1107). On the contrary, the left lens (1108) acts as a primary channel and needs to have a measurement point (1110) adjacent to a sound signal source (1106) under interest. Although one considers this principle while configuring the dual-channel laser audio monitoring system (1100, 1101, 1102, 1103 and 1104) with respect to a reflecting surface of the target (1105), relative location of sound and noise signal sources (1106 and 1107), and the convolutional properties of a target side frequently complicate the signals' content obtained from the measurement points (1110 and 1111). Nonetheless the dual-channel laser audio monitoring system (1100, 1101, 1102, 1103 and 1104) fulfills a concurrent acquisition of two channels and offers dual-channel sensory data for the applications of the advanced signal processing methods, such as cross-talk-resistant noise cancellation, Wiener filtering and blind source separation.

The control unit (1103) saves the two-channel data to an internal hard disk drive without facing any data loss even when the battery is discharging completely or even in a case of a probable logical disk error. The data gathered in any measurement session can be easily transferred to a USB flash memory via the graphical user interface (1122) and the USB port (1123) on the front panel of the control unit (1103).

Figure 2:
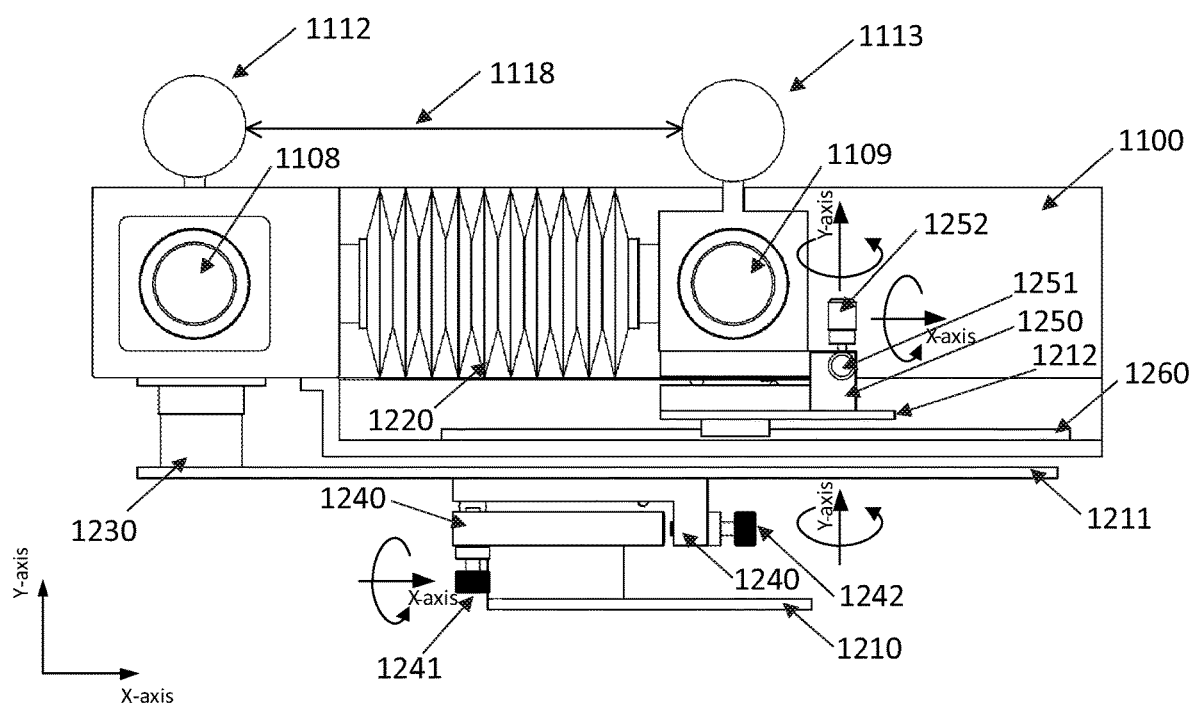
FIG. 2 is a front view illustrating the lenses, telescopes over lenses, linear guide, shock absorbers and adjustable plates with tilt and rotate units for perpendicularity adjustment of the transducer unit of the embodiment.

FIG. 2 shows the mechanical parts of the transducer unit (1100) in detail, which enable the adjustment of perpendicularities of the left probe beam (1114) and the right probe beam (1115), emitted from the left lens (1108) and the right lens (1109), respectively, to the reflecting surface of the target (1105). Perpendicularity adjustments are performed through three adjustable plates (1210, 1211 and 1212).

First adjustable plate (1210) is placed on the tripod (1101) and it moves the transducer unit (1100) around X and Y axes for coarse adjustments. In order to obtain a "rough" perpendicularity with coarse adjustments, a reflection of the transducer unit (1100) should be seen on the remote reflecting surface of the target object (1105) by either one of the telescopes (1112 and 1113) installed over lenses (1108 and 1109).

Second adjustable plate (1211) via the tilt and rotate platform (1240) moves the transducer unit (1100) around X and Y axes making the fine adjustments especially for the left probe beam (1114) emitted from the left lens (1108). The tilt and rotate platform (1240) has two adjusting knobs (1241 and 1242) which facilitate movement along X and Y axis, respectively. After the completion of fine adjustments of the left lens (1108), i.e. perpendicularity of the left probe beam (1114) emitted from the left lens (1108) to the reflecting surface of the target (1105) is fulfilled, perpendicularity of the right probe beam (1115) emitted from the right lens (1109) to the reflecting surface of the target object (1105) is started to be adjusted.

The right lens (1109) is placed on the third adjustable plate (1212) with a tilt and rotate platform (1250) which provides control of beam direction in both X and Y direction. Linear guide (1260) enables the operator to change the distance between probe beams by moving the right lens (1109) along the X-axis while keeping the position of the left lens (1108) fixed. The interval (1118) between two lenses (1108 and 1109) and hence between two probe beams (1114 and 1115) can be arranged by the linear guide (1260). Tilt and rotate platform (1250) with two adjusting knobs (1251 and 1252) moves the right probe beam (1115) around X and Y axis for fine adjustments, i.e. for adjusting perpendicularity of the right probe beam of the right lens (1109) to the reflecting surface of the target (1105). Both of the probe beams (1114 and 1115) have to be perpendicular to the reflecting surface of the target (1105). The user carries out rotating and/or pivoting movements so that her/his own image appears in the field of view of the telescope and somewhat centered on reticle. Close perpendicularity can be achieved if the user centers the crosshair slightly above the image of optical head image seen off of shiny target surface. As shown in FIG. 1, there is a light panel (1119) constituting of two led bar graphs (1120 and 1121) on the transducer unit (1100) serving as an assistive indicator of perpendicularity upper led bar graph (1120) indicates the level of electrical analog signal version of the optical interference signal obtained from the left lens (1108) while the lower led bar graph (1121) indicates the level of interference signal obtained from the right lens (1109). Higher signal level on a led bar graph (1120 or 1121) means that exact perpendicularity of the laser beam of the relevant lens (1108 or 1109) to the remote reflecting surface of the target (1105) is approached and hence better, less noisy sound signal is expected to be obtained.

Bellows (1220) between the left lens (1108) and the right lens (1109) is used to transport the reflected probe beam of the right lens (1116) to the optical module (2000). Shock absorbers (1230) are also used to avoid effects of ground vibrations.

Figure 3:
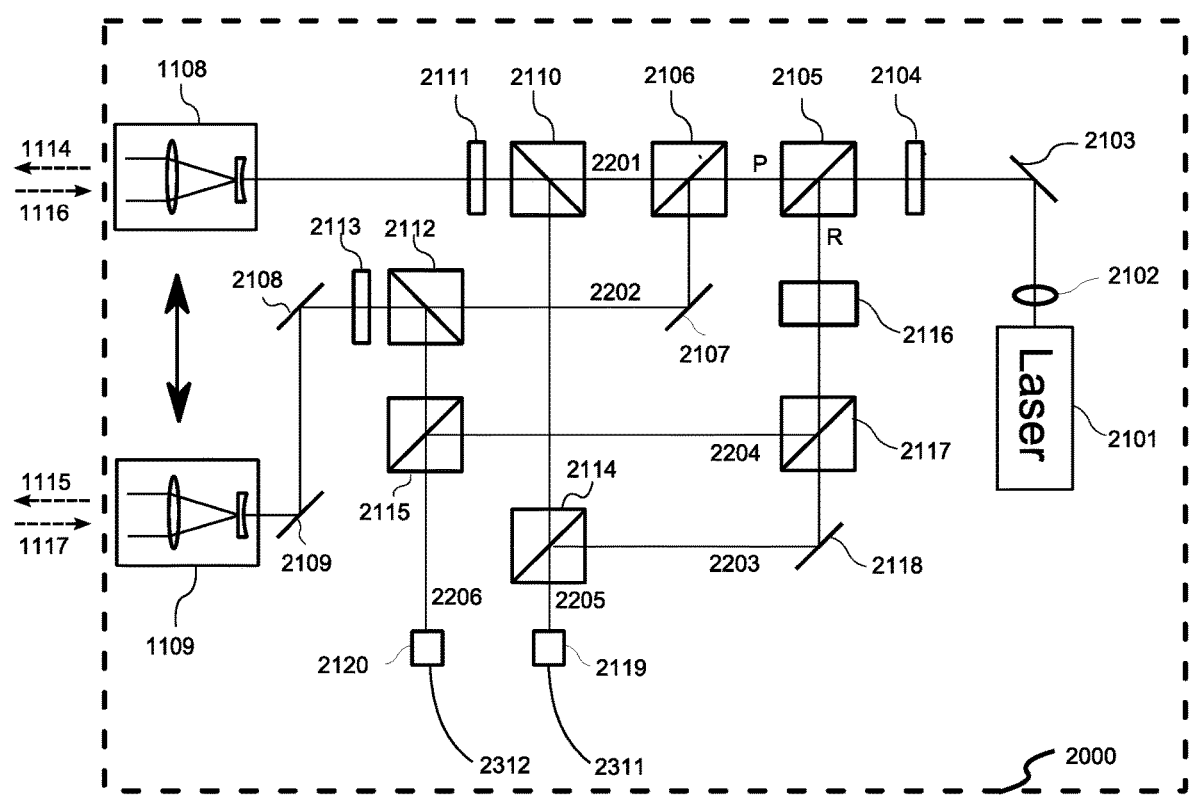
FIG. 3 is a detailed schematic view of the optical module and its components and arrangement of the components of the dual channel laser audio monitoring system of the invention.

With reference to FIG. 3, the optical module (2000) may include a laser (2101) as a radiation source. For example, the laser may be a single continuous-wave fiber laser that produces an ultra-narrow line-width 1550 nm beam.

The optical module (2000) is constructed so that measurements can be performed at least in a distance range from 20 m to 60 m, preferably from 10 m to 200 m.

Inside the optical module (2000), the output beam of the laser is coupled into free space through a collimator (2102). The numerical aperture (NA) of the collimator (2102) is selected to keep the beam size small yet large enough to be expanded later on the beam path. A mirror (2103) bends the laser beam and a half-wave plate (HWP) (2104) may be positioned downstream of the collimator (2102) to rotate the polarization of the beams and thus provide variable control of the irradiance of beams downstream thereof. The output beam may then be split into a probe beam (P) and a reference beam (R) at a first polarizing beams splitter (PBS) (2105). As shown in the example in FIG. 3, the S-polarized portion of the output beam is reflected by the PBS (2105) and used as the reference beam (R), and the P-polarized portion of the output beam is transmitted by the PBS (2105) and used as the probe beam (P).

Along the path of the probe beam, i.e., the probe path, a non-polarizing beam splitter (NPBS) (2106) may be positioned to split the beam into two probe beams (2201 and 2202) of equal power. The probe beam reflected off of NPBS requires additional mirrors (2107, 2108 and 2109) to direct the beam through the optical module (2000) and position the two channel beams parallel to each other at the exit of optical module (2000). Additionally, both probe beams include their own PBS (2110 and 2112) and quarter wave plates (QWP) (2111 and 2113) to efficiently direct the probe to the target and receive the returning signal from target into the respective detectors. The beams are circularly-polarized at the exit of the optical module (2000). A beam expander lens system (1108 and 1109) is positioned at the exit of probe beams (1114 and 1115) to expand and collimate probe beams to reduce their divergence thereby allowing long-distance probing. The lens system (1108 and 1109) may also focus the probe beams (1114 and 1115) onto the targeted object (1105) under inspection. Both probe beams irradiate target and read the vibrations of two distinct measurement points (1110 and 1111) on the target object (1105).

Vibrations of the target object (1105) frequency modulate each of the probe beams simultaneously. A portion of these modulated probe beams (1116 and 1117) is reflected back to the optical module (2000). In the embodiment shown in FIG. 3, the modulated probe beams (1116 and 1117) may pass through the QWP (2111 and 2113) and rotate to S-polarization. The modulated probe beams (1116 and 1117) may then be reflected at the PBS (2110 and 2112). Downstream of PBS (2110 and 2112), beam splitter (NPBS) (2114 and 2115) may be positioned to overlap probe beam with reference beam, which will be discussed in more detail below.

Turning to a path of the reference beam, in the embodiment shown in FIG. 3 the reference beam may be initially frequency shifted. To do so, in a number of embodiments the reference beam R may travel through one or more Brag cells. In this embodiment of the invention, one Bragg Cell (2116) is employed. As an example, Bragg Cell (2116) operating at a frequency of 80 MHz can be utilized to drift frequency of reference by 80 MHz. The drift can be both positive or negative. Only one direction is selected.

Upon being frequency shifted, the reference beam R may be split into two reference beams (2203 and 2204) to match the split on probe branch through a beam splitter (NPBS) (2117). The reflected reference beam (2203 or 2204) will combine with one of the object on beam splitters (NPBS) (2114 and 2115). The transmitted reference beam further reflects off mirror (2118) and superimpose with corresponding probe beams on the photodetectors (2119 and 2120) so that two interference beams (2205 and 2206) are obtained. Lens elements are utilized to further focus the interference beams (2205 and 2206) on the photodetectors (2119 and 2120). To further reduce the spectral content of the return beam a bandpass filter may be included just before the photodetectors (2119 and 2120). The photodetectors (2119 and 2120) convert optical interference signals (2205 and 2206) into two electrical raw analog signals (2311 and 2312) which are actually frequency modulated audio signals at the carrier frequency defined by the Bragg Cell (2116).

Additional beam splitters may be added into the optical module (2000) with additional optics to produce plurality of beams.

The beam splitter (NPBS) (2114 or 2115) combines each of the reference beams with a respective one of the modulated probe beams, thereby yielding a corresponding interference beam pairs (2205 or 2206), wherein each beam pair includes a modulated probe beam and a frequency-shifted reference beam.

Lenses focus the modulated probe and reference beam pairs onto the photodetectors (2119 and 2120).

Each of the photodetectors (2119 or 2120) senses a frequency-modulated signal of a beam pair (2205 or 2206). The frequency-modulated signal of each beam pair (2205 or 2206) has a carrier frequency given by the frequency of the Bragg Cell. In addition, frequency-modulated signal of each beam pair (2205 or 2206) has a very small frequency deviation caused by vibration of the object at two points.

Because of the dual probe beams, the dual channel laser audio monitoring system is able to do simultaneous measurements at two measurement points (1110, 1111) on the surface of the target object (1105).

The polarization of the modulated probe beams and the polarization of the frequency-shifted reference beams are the same (S-polarized) before they get superimposed on NPBS.

Figure 4:
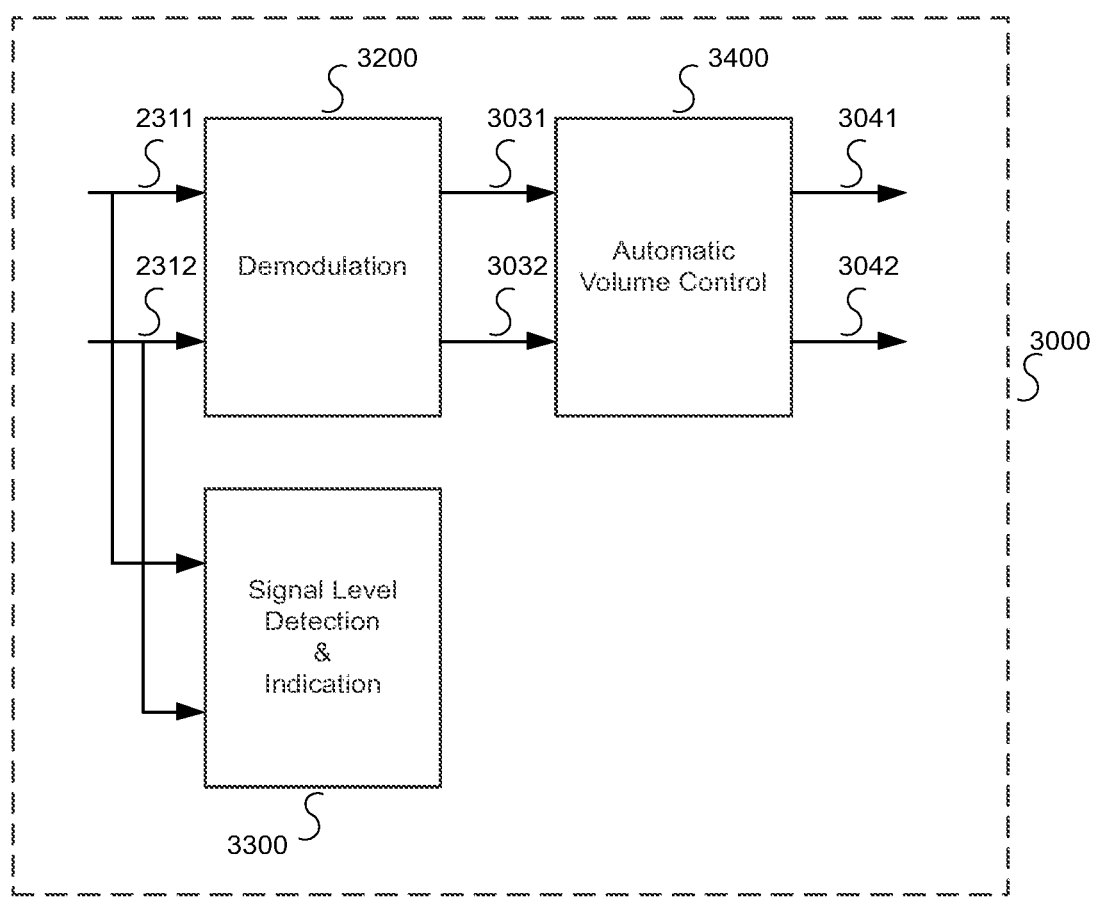
FIG. 4 is a block diagram of the analog processing module of the preferred embodiment of this invention.

Analog processing module (3000) of the device is shown in FIG. 4. Analog processing module (3000) of the device takes place between the optical module (2000) and the filtering module (4000). Analog processing module (3000) comprises a demodulation block (3200), a signal level detection and indication block (3300), an automatic volume control block (3400). The task of analog processing module (3000) is to extract analog sound signals (3041 and 3042) in the audible frequency band from the two analog raw signals (2311 and 2312) outputted by the photodetectors (2119 and 2120).

Demodulation block (3200) demodulates frequency modulated signals (2311 and 2312) and generates two raw analog audio signals (3031 and 3032). The signal level detection and indication block (3300) indicates signal level to the operator through led bar graphs (1120 and 1121) of the light panel (1119) on the transducer unit (1100) in order to provide assistive visual information in aligning perpendicularities of probe beams (1114 and 1115) to the reflecting surface of the target (1105) and to receive more modulated laser intensity to obtain a sustained and a higher quality audio signal.

The automatic volume control block (3400) ensures to get sustainable unclipped signal levels by processing demodulated raw audio signals (3031 and 3032). So that the automatic volume control block (3400) outputs unclipped audio signals (3041 and 3042) for further processing.

Figure 5:
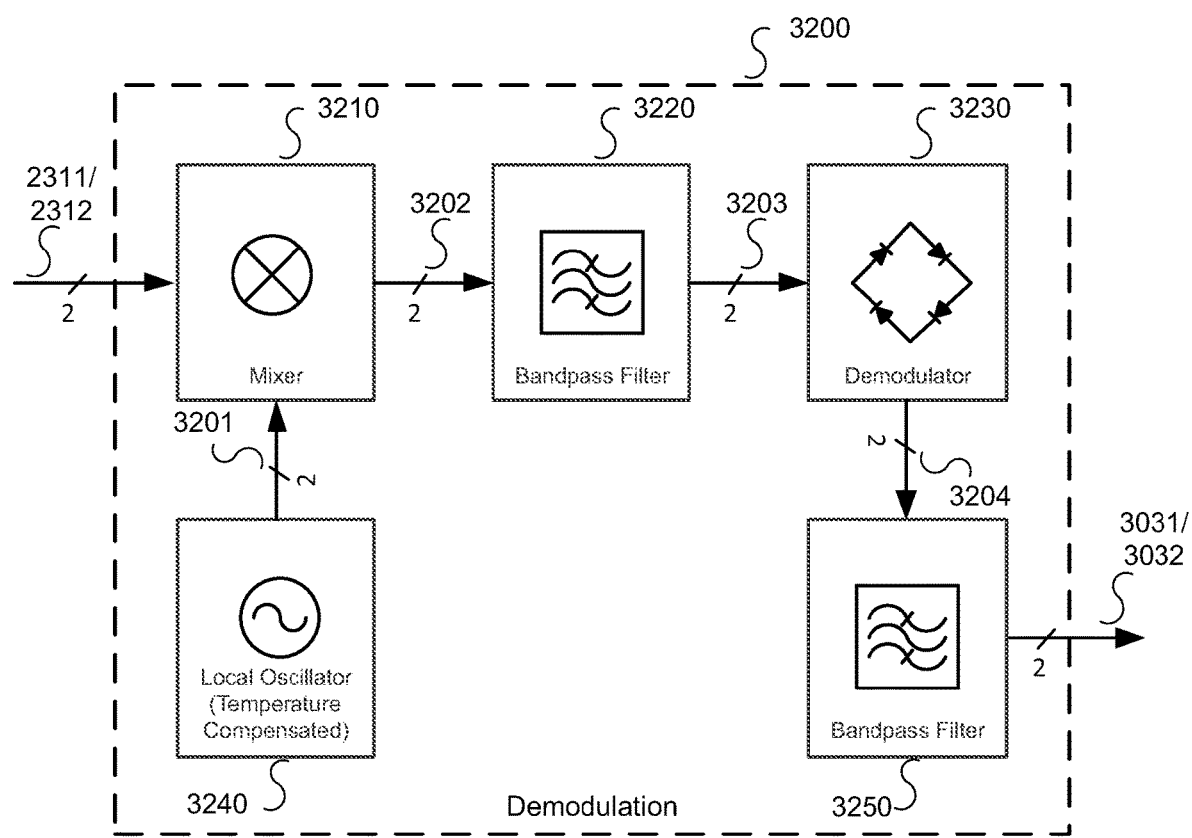
FIG. 5 is a block diagram of the demodulation block of the analog processing module of the embodiment.

FIG. 5 depicts the detailed block diagram of the demodulation block (3200) of the analog processing module (3000). Frequency modulated signals (2311 and 2312) are mixed in the mixer blocks (3210) by local signals (3201) produced by the local oscillators (3240). Outputs (3202) of the mixer are filtered by the bandpass filters (3220) in order to suppress unwanted signals such as harmonics, and then desired intermediate frequency signals (3203) are obtained. Intermediate frequency signals (3203) are then presented to the demodulator blocks (3230). After demodulation, analog bandpass filters (3250) with flat frequency responses at 34-3183 Hz range and 26 dB gain are applied to the output signals (3204) of the demodulator blocks (3230) in order to obtain and condition the raw audio signals (3031 and 3032).

An interference signal (2205 or 2206) at the input of a photodetector (2119 or 2120) and a further electrical raw analog signal (2311 or 2312) at the output of a photodetector (2119 or 2120) is obtained as a frequency modulated audio signal at the carrier frequency of the reference beam (2203 or 2204) (frequency shifted beam by Bragg Cell) with a very small deviation produced by vibration of the target object (1105). The frequency shift of the reference beam is 80 MHz as determined by the Bragg Cell (2116). Whereas, the frequency variation derived by the displacement of the target object (1105) depends on the frequency of the voice signal and the wavelength of the laser beam by the following equation:

$$\text{Frequency deviation} = 2 \times \text{wavelength} \times \text{frequency of the sound signal} \times \text{displacement}$$

As the equation states and since the wavelength of the laser beam is in the invisible region and the audio frequency is in 30-3400 kHz region, the deviation occurred on a reflected probe beam (1116 and 1117) is below 5 Hz which is so low as compared to the carrier frequency. The problems depicted by this situation are:

Even moderate phase noise of the carrier frequency in the region of the 10 Hz around it degrades the performance of the demodulation block (3200).

The poor linewidth of the laser beam shows the same degradation on the performance.

A conventional narrow band FM demodulator operated in 88-108 MHz cannot be used for very narrow band FM signals since conventional FM demodulators can detect 75 kHz frequency deviation at nominal and thus converts this level of high deviation to sound signal.

In order to be able to detect frequency deviation below 10 Hz, following solutions are utilized in the invention:

The linewidth of the laser source (reference) is selected as less than 1 kHz.

The local oscillators (3240) are used with a high carrier-to-noise ratio and with better phase noise performance in the region of 10 Hz around carrier frequency as well.

Temperature compensated local oscillators (3240) are also used in order not to drift in any temperature variation probably occurs in the demodulator circuit and other electronic components of the control unit (1103).

The locking frequency of phase-lock-loop or center frequency of the bandpass filters (3220) (IF frequency) in the demodulation block (3200) is selected as low and close to the deviation frequency as possible. So that audio signals with higher amplitudes are obtained with higher swinging of the phase-lock-loop control voltage.

The solution given above has the following advantages:

As can be seen from above equation, 0.5 nm and below displacements of the target (1105) can be detected by the demodulation block (3200), because displacements of 0.5 nm and below correspond to frequency deviations below 5 Hz for the laser wavelength used in the preferred embodiment of the invention.

The audio signal to noise ratio obtained by the demodulation block (3200) is above 40 dB or higher than the conventional narrow band FM demodulators operating at 5 Hz deviation range.

Figure 6:
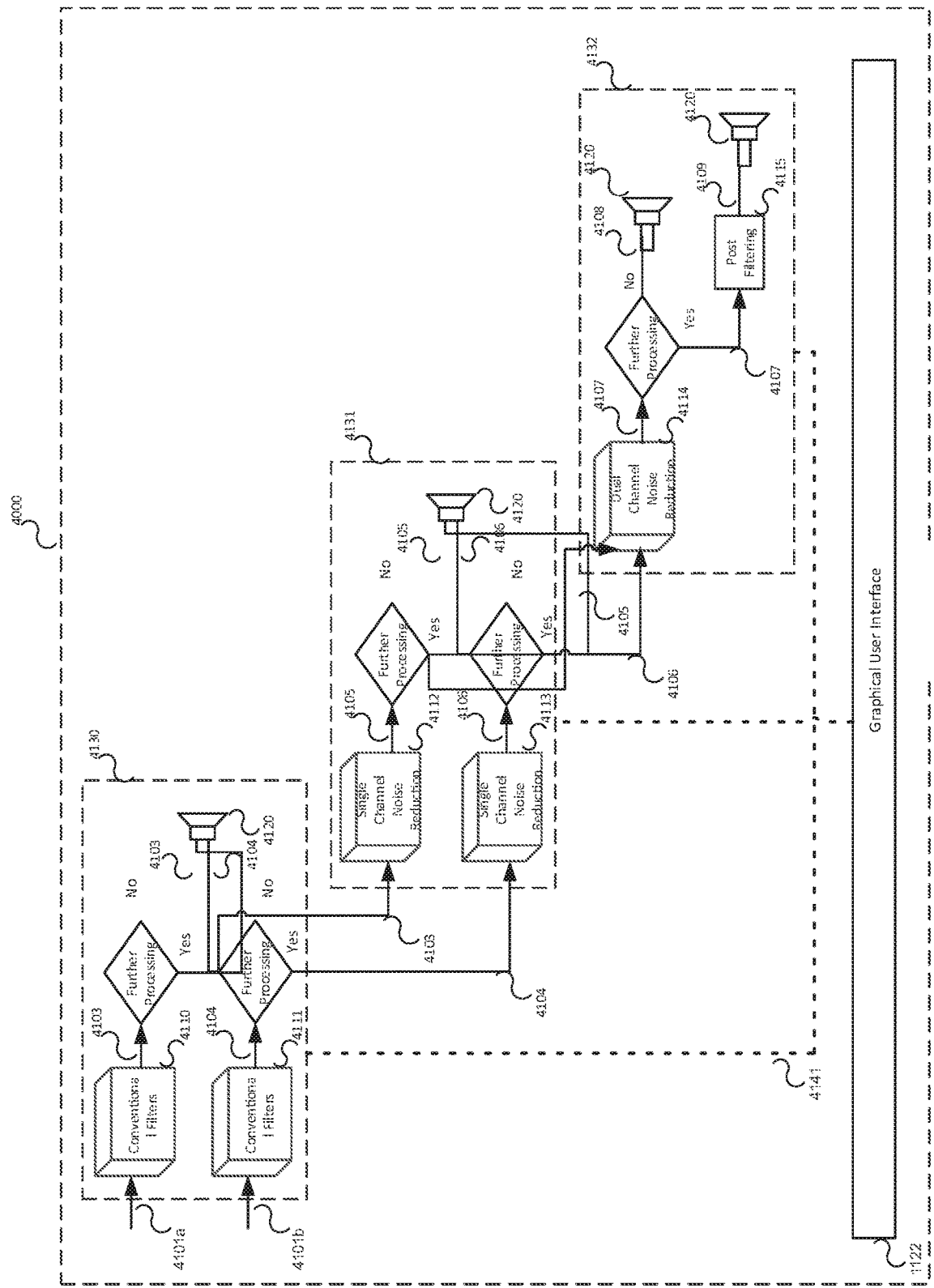
FIGS. 6 (a)-(c) is a block diagram that schematically depicts the functioning of the filtering module according to an embodiment of this invention.
Figure 6:
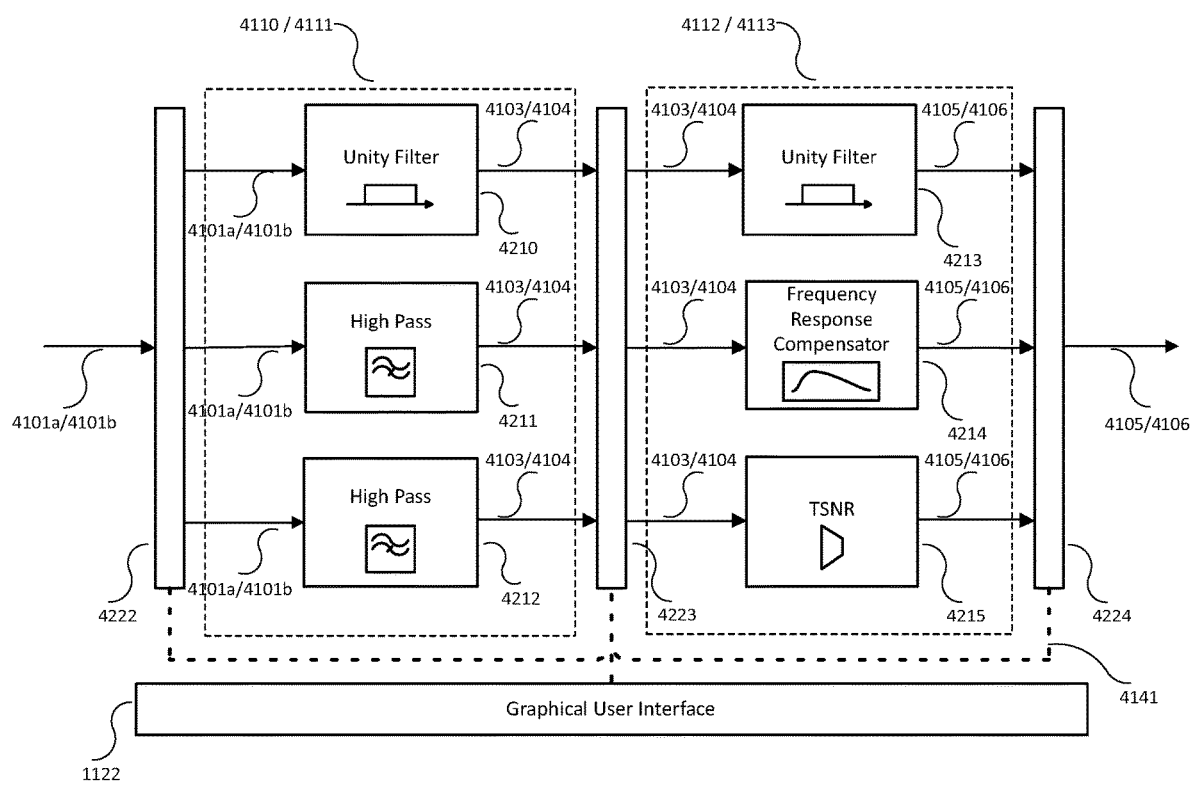
Figure 6:
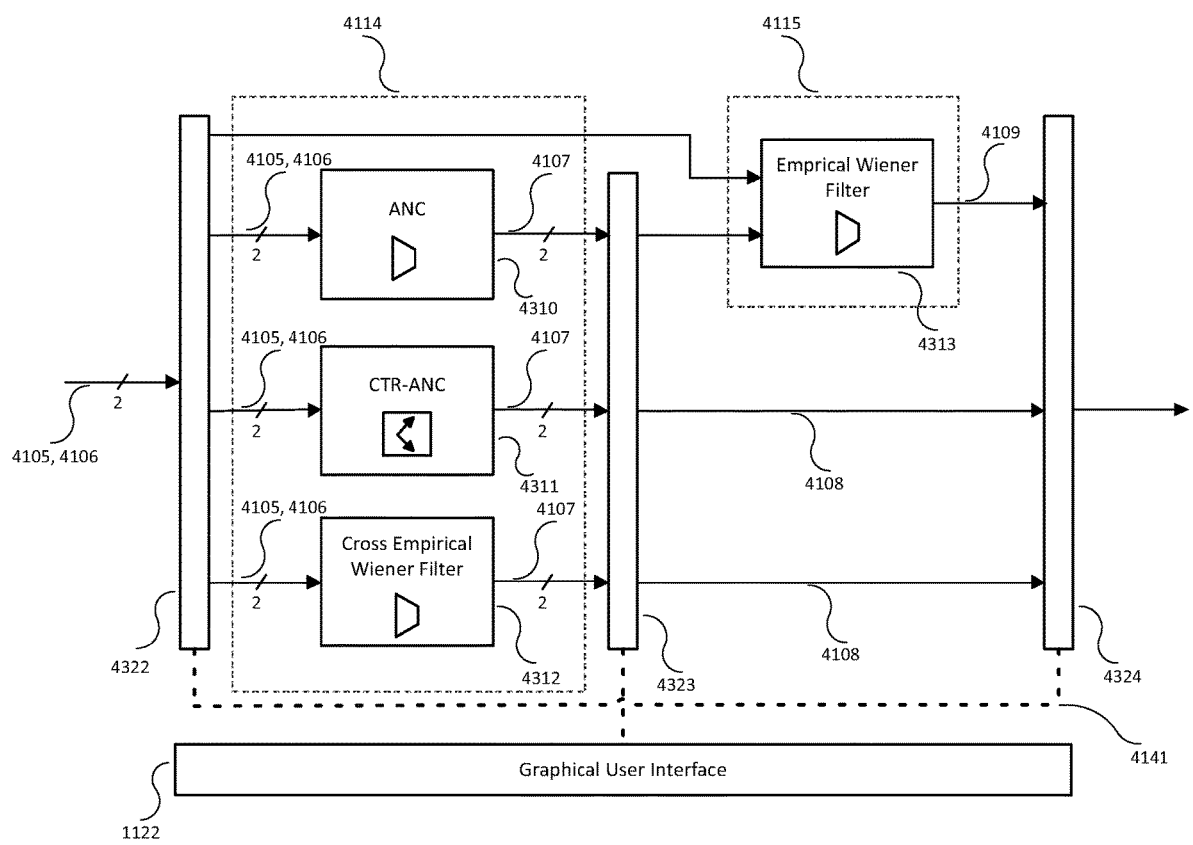

FIGS. 6 (a)-(c) shows the flow diagram of filtering module (4000) having the task of noise reduction and signal separation. The filtering module (4000) presents a plurality of filtering methods at three stages (4130, 4131 and 4132) which can be applied sequentially or individually to two channel sound signals (4101a and 4101b) which are the raw audio signals (3041 and 3042) outputted by the analog processing module (3000).

Operator can navigate among the different stages via the graphical user interface (1122). Furthermore, all operations at all filtering stages, i.e., filter type selection, filter parameters adjustment and listening are executed by the graphical user interface (1122). Rectangle shape vertical bars (4222, 4223, 4224, 4322, 4323 and 4324) are so-called soft switches, which enable to steer selected inputs and outputs to selected filters or stages. Rectangle shape vertical bars (4222, 4223, 4224, 4322, 4323 and 4324) linked to each other through dashed lines (4141) are controlled by the graphical user interface (1122).

The first stage of filtering module (4000) is the prefiltering stage (4130). Two-channel signals (4101a and 4101b) are inputted to the conventional filters blocks (4110 and 4111) at the prefiltering stage (4130). A conventional filters block (4110 or 4111) comprising a unity filter (4210) and two conventional digital high-pass filters (4211 and 4212) with two different cut-off frequencies. High-pass filters (4211 and 4212) are used to remove background low-frequency noise and they are applied to both channels (4101a and 4101b) individually. High-pass filters (4211 and 4212) are IIR (Infinite Impulse Response) type filters with each different cut-off frequency customized in accordance to a low-end frequency of the sound signal and high-end frequency of likely background noise. A single high-pass filtered channel sound signal (4103 or 4104) or both high-pass filtered channel sound signals (4103 and 4104) can be listened via speakers (4120), which are stereo headphones (1104) in the preferred embodiment of the invention. Channel selection is made through the graphical user interface (1122) depending on operator's preference. Unity filters (4210) of conventional filters blocks (4110 and 4111) output both channel raw signals (4101*a* and 4101*b*) either to the next stage filters (4131 or 4132) for further processing and noise reduction or to the speakers (4120) to listen to target sounds. If the operator prefers to listen to sound signals through speakers (4120) at this prefiltering stage (4130), no further filtering can be applied to channel signals. All operations outlined above, i.e., filter type selection, filter parameters adjustment and listening are executed by the graphical user interface (1122).

Stage after the prefiltering stage (4130) is so-called the first stage filtering (4131). Each single channel noise reduction block (4112 or 4113) of the first stage filtering (4131) comprises a unity filter (4213), a frequency response compensator (4214) and a TSNR (two-stage noise reduction) filter (4215) which can be applied to input signals (4103 and 4104) depending on operator's choice.

The first filter type of a single channel noise reduction block (4112 or 4113) of the first stage filtering (4131) is a custom-designed frequency response compensator (4214) filter which utilizes the characteristics of the target (1105) and transfer functions of analog demodulation block (3200). In other words, frequency response compensator (4214) compensates both transfer functions of the material properties of the target (1105) and the analog demodulation block (3200) comprising two combined inverse functions: one is analytically derived and normalized from the material properties of the target (1105), and the other is measured and normalized from frequency deviation versus output level curve of the demodulation block (3200).

The second filter type of a single channel noise reduction block (4112 or 4113) of the first stage filtering (4131) is called the TSNR (two-stage noise reduction) filter (4215) which estimates additive noise characteristics in a channel signal. The TSNR filter extracts noise and sound signal information from channel signals (4103 and 4104) by estimating short-time spectral gain depending on the signal-to-noise ratio. Noise variance needed for short-time spectral gain estimation is evaluated from the initial interval of a channel signal (4103 or 4104) by assuming that very beginning short period of an input signal (4103 or 4104) consists of noise only. Either filter type, i.e. frequency response compensator (4214) or TSNR filter (4215), considers that only a single channel signal (4103 or 4104) is in hand and thus can utilize information from that single channel signal (4103 or 4104). In other words, neither frequency response compensator (4214) nor TSNR filter (4215) demands information other than the channel signal at its input (4103 or 4104). Filter type and then input signal (4103 or 4104) are chosen by the operator via the graphical user interface (1122). A filtered channel signal (4105 or 4106) or both filtered channel signals (4105 and 4106) can be listened through speakers (4120).

Unity filter (4213) of the first stage filtering (4131) passes both channel input signals (4103 and 4104) to the second stage filtering (4132) for further noise reduction. If the operator prefers to listen to the signals (4105 and 4106) at this stage, no further filtering can be applied.

The stage after the first stage filtering (4131) is the second stage filtering (4132). Dual channel noise reduction block (4114) of the second stage filtering (4132) comprising a conventional ANC (adaptive noise canceller) (4310), a CTR-ANC (crosstalk resistant adaptive noise canceller and its asymmetric variant) (4311), a cross empirical Wiener filter (4312) and an empirical Wiener filter (4313) as a post filter. ANC (4310), CTR-ANC (4311) and cross empirical Wiener filter (4312) are used to reduce noise from an operator selected primary signal channel (4105 or 4106) input by simultaneously utilizing noise information from the other signal channel (4106 or 4105) called a reference input. Thus, if 4105 is chosen as a primary input, 4106 becomes the reference input, but if 4106 is chosen as a primary input, 4105 becomes the reference input.

For the sake of simplicity and better understandability of the invention, primary input and reference input are accepted to be chosen as 4105 and 4106, respectively, in the rest of this "Detailed Description of the Invention" section. The type of filter and filter adjustment parameters are controlled by means of the graphical user interface (1122). Main difference of the dual channel noise reduction block (4114) of the second stage filtering (4132) from the conventional filters blocks (4110 and 4111) of the prefiltering stage (4130) and the single channel noise reduction blocks (4112 and 4113) of the first stage filtering (4131) is to utilize information from both channels (4105 and 4106). Apparently, filters of dual channel noise reduction block (4114) employ two channel signals as inputs (4105 and 4106) considering one operator selected input as primary (4105) and less noisy while taking the other input as a reference (4106) and noisier.

In the dual channel noise reduction block (4114) of the second stage filtering (4132), first filter type from a group of filters is the conventional ANC (adaptive noise canceller) (4310) filter. It is assumed that the primary input (4105) comprising the target sound under surveillance corrupted by additive noise, while the reference input (4106) is assumed to be the original noise source correlated with the additive noise in the primary input (4105). The transfer function from the reference input (4106) to the primary input (4105) using NLMS (Normalized Least Mean Square) algorithm is estimated. In other words, the reference input (4106) is processed by an NLMS based adaptive filter to generate a replica of the additive noise in the primary input (4105). However, in order for this filter to work efficiently, the reference input (4106) must be highly correlated with the noise components in the primary input (4105). This condition implies either the measurement points (1110 and 1111) on the reflecting surface of the target object (1105) where primary input (4105) and reference input (4106) signals collected are in a close proximity, or there is a close spacing between the points where the reference input (4106) collected and the noise source contaminating the sound signal under surveillance in the primary input (4105).

As it is mentioned, main function of the linear guide (1260) on the transducer unit (1100) is to adjust the interval (1118) between the two lenses (1108 and 1109) acquiring signals which are primary and reference inputs to the dual channel noise reduction block (4114) filters (4310, 4311 and 4312). Therefore, the interval (1118) between two lenses (1108 and 1109) are tried to be adjusted by means of the linear guide (1260) in order for the dual channel noise reduction block (4114) filters (4310, 4311 and 4312) operate effectively. Unfortunately, this can be achieved to some extent due to interference of target sound signal (1106) components to the reference sensor signal/input (4106). The leakage or crosstalk into the reference signal (4106) from the sound signal components of the primary input (4105) causes poor performance of the conventional ANC (4310). Thus, a CTR-ANC (4311) is utilized in dual channel noise reduction block (4114) in order to overcome the crosstalk problem. Two cross transfer functions, one from a noise source (1107) to the primary input (4105) and the other from a target sound source (1106) to the reference input (4106) are estimated by using two NLMS based adaptive filters. So that, a replica of target sound source (1106) and a replica of noise source (1107) components are subtracted from the reference and primary signals, respectively. Such a filtering approach, i.e., energy minimization of both outputs, allows a closer interval (1118) between the measurement points (1110 and 1111) where primary and reference signals are accessed. Moreover an adjunct parameter representing the physical interval (1118) between the two lenses (1108 and 1109) and thus the time difference between the optical channel signals can be included to put a null at the direction of noise source to further increase the noise separation and cancelling. This comprises asymmetric cross-talk resistant adaptive noise canceller as a variant of the CTR-ANC (4311).

The third selectable filter of the dual channel noise reduction block (4114) of the second stage filtering (4132) is a cross empirical Wiener filter (4312). In the cross empirical Wiener filter (4312), primary input (4105) can be a means to design a Wiener filter while the reference input (4106) is used for its application. Primary input (4105) is considered as mostly "noise free" target sound signal and it is leveraged into a design of an empirical Wiener filter. In other words, primary input (4105) is taken as a known output of a Wiener filter while the noisy reference input (4106) is presented as an input to it. Hence, the transfer function of the Wiener filter can be estimated empirically by using primary and reference inputs, 4105 and 4106 respectively; however, estimation of an empirical Wiener filter transfer function requires also the variance of the additive noise to be known. Since noise variance is not in hand, operator is equipped to change the noise variance value of the empirical Wiener filter via a slider button (5903a, 5903b) on the graphical user interface (1122) during operation of the cross empirical Wiener filter (4312) and also while listening to the filter output (4108). So that the noise variance yielding best quality target sound can be determined by the operator.

In second stage filtering (4132), a channel signal can be chosen as primary or reference based on operator's initiative. Operator can switch filter inputs between two channel signals (4105 and 4106) via the graphical user interface (1122) depending upon the filter performance. If the operator prefers to listen to the filtered signals at this stage, no further post filtering (4115) can be applied to the output (4107) of the dual channel noise reduction block (4114). One can also easily note that dual channel listening is not possible at the second stage filtering (4132) on the contrary to the prefiltering stage (4130) and the first filtering stage (4131). The reason for single channel listening by means of a speaker (4120) which is a stereo headphone (1104) in the preferred embodiment of the invention is the two channel inputs are utilized simultaneously in designing filters (4310, 4311 and 4312) of the dual channel noise reduction block (4114) of the second stage filtering (4132). Actually, conventional ANC (4310), CTR-ANC (4311) and cross-empirical Wiener (4312) filters of the dual channel noise reduction block (4114) produce two outputs (4107), ideally: one is the estimation of the noise free target sound and the other is the estimation noise without target sound. Operator can switch between the noisy and noise free filtered outputs of conventional ANC (4310) or CTR-ANC (4311) or cross empirical Wiener filter (4312) via the graphical user interface (1122) so that only one preferred output (4108) can be listened through a speaker (4120) which is a stereo headphone (1104) in the preferred embodiment of the invention at a time.

Operator may need to further filter the conventional ANC (4310) or CTR-ANC (4311) output with a post filter (4115) which is another empirical Wiener filter (4313). In the post filtering (4115) step, output (4107) of the ANC (4310) or CTR-ANC (4311) is considered as cleaned target sound signal and is taken as a known output of a Wiener filter while the channel signal chosen as primary input (4105) of the dual channel noise reduction block (4114) is assigned as an input to the post filter (4115). In this case, the transfer function of the Wiener filter can be estimated empirically by using output (4107) and input (4105) signals and the noise variance which is not actually known. Since noise variance is not in hand, operator is allowed to change the noise variance value of the empirical Wiener filter (4313) via a slider button (5903a, 5903b) on the graphical user interface (1122) during operation and also while listening to the post filtering (4115) output (4109) via a speaker (4120) which is a stereo headphone (1104) in the preferred embodiment of the invention. Thus, the operator can determine and input the best noise variance value to the empirical Wiener filter (4313) enabling estimation of the best transfer function which yields a mostly noise free post filtered signal (4109).

The device has a graphical user interface (1122) (GUI) which facilitates controlling the operation of the device and utilization of the device features. The GUI has various windows with buttons which are displayed on a touch screen to constitute an interface between the dual channel laser audio monitoring system and the operator. GUI windows are designed to provide an easy to use interface for the operator to control the system features and get information about the system status. The GUI (1122) and hence the touch screen is located on the control unit (1103).

Figure 7:
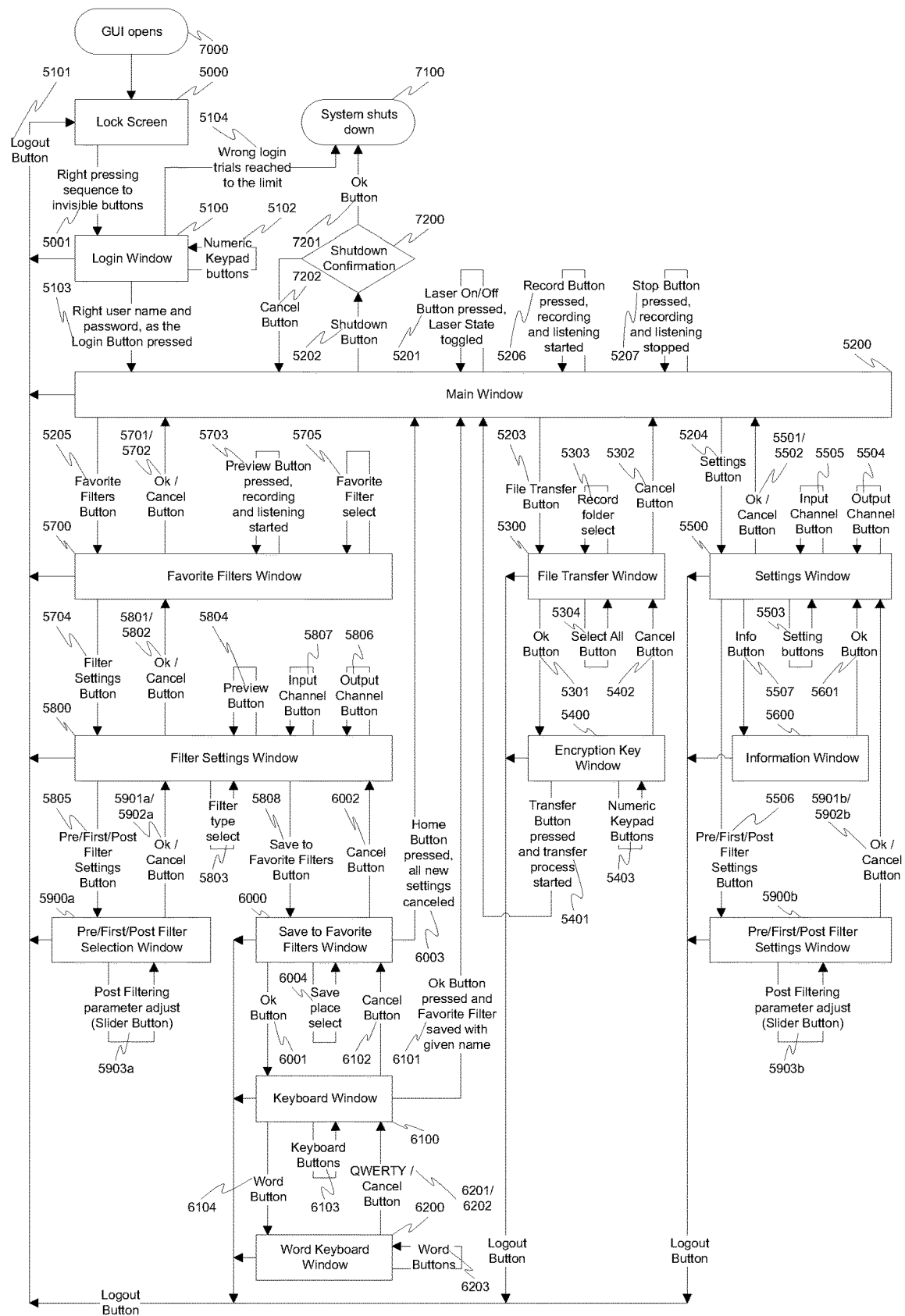
FIG. 7 is a block diagram that schematically shows window organization of the Graphical User Interface to a preferred embodiment of this invention.

FIG. 7 shows the block diagram of the GUI (1122) which represents the connections between the windows and how to navigate from one to another. Features of the windows' buttons are also represented in FIG. 7.

Operator navigates among the windows and reaches a particular window to accomplish the tasks like logging in (5100), logging out (5101), changing the laser on/off state (5201), starting (5206) or stopping (5207) the recording, loading and running a favorite filter (5700), setting a filter or setting the filter parameters (5800, 5900a and 5900b), saving a favorite filter (6000, 6100 and 6200), transferring the recorded data to an external data storage device (5300 and 5400), setting the system settings (5500), viewing the laser information (5600) and shutting down the system (5202). The features of the windows and windows' buttons are described in detail below.

When the system is powered on it starts loading the GUI. After the load process is completed GUI opens (7000) with the Lock Screen (5000).

The Lock Screen (5000) is used to lock the screen and protect the system from unauthorized persons. The Lock Screen (5000) is unlocked by using the invisible buttons that are placed to the particularly designated locations on GUI (1122), e.g., four corners of the screen. Operator should press these invisible buttons in a predetermined sequence (5001) to close the Lock Screen (5000) and open the Login Window (5100). Appearance of the Lock Screen (5000) may be any image, which is loaded from an image file.

The Lock Screen (5000) can be opened from any window by pressing the Logout Button (5101), which exists in every window.

The Login Window (5100) is used for a user to login. There are two user types defined in the system, one is the authorized user and the other is the guest user. The only difference between the guest user and the authorized user is that, when a user is logged in as a guest user the File Transfer Button (5203) in the Main Window (5200) is inactive. Thus the guest user cannot transfer the recorded data to an external data storage device.

The Login Window (5100) has a Numeric Keypad (5102) and a Login Button. An operator enters his/her individual user name and password by using the Numeric Keypad (5102) displayed on GUI and presses the Login Button. If the login sequence is successful (5103), then the Login Window (5100) closes and the Main Window (5200) opens.

If the login sequence is not successful and reached to the limit of wrong login trials (5104), for example three, then the system shuts down (7100) automatically, assuming that the login trials are made by an unauthorized person.

The Main Window (5200) is used for getting information about the battery condition, changing the laser source (2101) on/off state (5201), shutting down the system (5202), accessing to the other windows that are used to set and control the device features (5203, 5204 and 5205), starting (5206) and stopping (5207) the record. To utilize these features the Main Window (5200) comprises the battery icon, the Laser On/Off Button (5201), the Shutdown Button (5202), the File Transfer Button (5203), the Settings Button (5204), the Favorite Filters Button (5205), the Record Button (5206) and the Stop Button (5207). The function of the battery icon and the buttons are as follows.

The battery icon shows the condition of the battery. If the device is not plugged into the mains power the battery icon shows the remaining battery capacity. If the device is plugged into the mains power and the battery is not full, the battery icon indicates as an animation that the battery is charging. When the battery is full, the animation stops, and the icon indicates that the device is plugged into the mains power and the battery is full.

When the Laser On/Off Button (5201) is pressed, the on/off state of the laser toggles and the color of the Laser On/Off Button (5201) changes accordingly. When the system first opens, the laser is in off state as an eye-safety precaution.

When the Shutdown Button (5202) is pressed the GUI asks for confirmation (7200) and after the confirmation (7201) the system shuts down safely and powers off automatically (7100). If the shutdown process is not confirmed (7202) GUI returns to the Main Window (5200).

When the Record Button (5206) is pressed the system starts recording the two-channel raw input and the two-channel filtered output sound data to the internal data storage device which is located in the control unit (1103). Recording to the internal data storage device is performed with encryption, aiming to protect the data from unauthorized persons. The target listening also starts as soon as the record button is pressed and performed on-line.

When the Stop Button (5207) is pressed the recording and the target listening stops. When the recording is stopped, the recorded sound files are named with the recording date and time, and stored in a record folder. The record folders are named with the recording date. As a result, the recorded sound files are stored in folders that are named with their individual recording date.

When the File Transfer Button (5203), the Settings Button (5204) or the Favorite Filters Button (5205) is pressed, the Main Window (5200) closes and the File Transfer Window (5300), the Settings Window (5500) or the Favorite Filters Window (5700) opens accordingly.

The File Transfer Window (5300) is used to select and transfer the record folders to an external data storage device with encryption.

The File Transfer Window (5300) comprises the Ok Button (5301), the Cancel Button (5302), the Select All Button (5304) and two lists. The first list is the System Storage List which lists all the record folders in the internal data storage device and the second list is the Transfer List which lists the record folders that will be transferred to the external data storage device. Any folder selected (5303) from System Storage List passes to Transfer List and vice versa. When the Select All Button (5304) is pressed all record folders listed in the System Storage List passes to Transfer List. Operator selects (5303) the folders that will be transferred to the external data storage and presses the Ok Button (5301). When the Ok Button (5301) is pressed, record folders which are listed in the Transfer List are approved that they will be transferred to the external data storage device, and the Encryption Key Window (5400) opens.

Every window in the GUI has its particular Ok Button (5301, 5501, 5601, 5701, 5801, 5901, 6001, 6101 and 7201) and Cancel Button (5302, 5402, 5502, 5702, 5802, 5902, 6002, 6102, 6202 and 7202) which are used to approve and cancel the operations performed in the window, respectively. When the Ok Button (5301, 5501, 5601, 5701, 5801, 5901, 6001, 6101 and 7201) of a window is pressed, the operations performed in the window are approved, the window closes and another window opens according to the window organization of the GUI. On the other hand, when the Cancel Button (5302, 5402, 5502, 5702, 5802, 5902, 6002, 6102, 6202 and 7202) of a window is pressed, the operations performed in the window are canceled, the system is brought to the settings before a particular window has opened, the window closes and another window opens according to the window organization of the GUI.

The Encryption Key Window (5400) is used to enter the encryption key for the data which will be encrypted using this key and transferred to the external data storage device. The Encryption Key Window (5400) comprises the Transfer Button (5401), the Cancel Button (5402) and the Numeric Keypad (5403). The Keypad Buttons (5403) are used to enter an encryption key which is designated by the operator. After the encryption key is entered, user presses the Transfer Button (5401) to start the transfer process. The data transfer process takes some time and when the transfer process is finished the Encryption Key Window (5400) closes and the Main Window (5200) opens.

The Settings Window (5500) is used for adjusting the system settings: output volume, brightness of the screen and laser power. Output volume is the sound volume of the speakers used for real-time target listening. Brightness of the screen is the brightness of the backlight in the touch screen. The laser power is the radiated laser power. Laser power is adjustable to achieve convenient reflected laser intensity. Too high or too low reflected laser intensity results in a poor sound quality.

The Settings Window (5500) comprises the Setting buttons (5503), the Output Channel Button (5504), the Input Channel Button (5505), the Pre/First/Post Filter Settings Button (5506), the Info Button (5507), the Ok Button (5501) and the Cancel Button (5502).

The Setting buttons (5503) are the increment and decrement buttons beside the corresponding settings to increase and decrease the setting values. As a setting value is changed the new value is applied immediately. Thus the operator can evaluate the results of the new setting easily.

The Output Channel Button (5504) is used for selecting the output channel which will be listened. When the Output Channel Button (5504) is pressed, the sound output of the system switches between the first and the second channels of the filtered sound data.

The Input Channel Button (5505) is used for interchanging the input channels (4101a and 4101b) of the filtering module (4000). In other words, when the Input Channel Button (5505) is pressed, 4101a and 4101b signals interchange.

When the Info Button (5507) is pressed the Information Window (5600) opens. The Information Window (5600) is used to inform the operator about the laser status variables like the Laser Temperature, the Laser Diode Current, the Laser Power, the Laser Module Temperature and the Laser Stability. These values are used for troubleshooting. Operator can check the inner and outer temperature of the laser (2101) with the laser temperature and the laser module temperature information respectively. The laser diode current and the laser power indicate the laser diode current value and the output laser radiation power according to this current, respectively. If one of them is not stable or not in the limits, then it means something is wrong with the laser or the environmental conditions that the laser (2101) is in. The laser stability indicator indicates that the laser temperature is stable or not at that moment. The Information Window (5600) also informs the operator about the system date and time.

When the Favorite Filters Button (5205) is pressed the Main Window (5200) closes and the Favorite Filters Window (5700) opens. The Favorite Filters Window (5700) is used to load a previously saved favorite filter and make it run. Favorite filters are useful as they are previously adjusted and expected to be well performing filters for a particular situation. Operator can load and try some previously adjusted filters by using The Favorite Filters Window (5700).

The Favorite Filters Window (5700) comprises the Favorite Filters List where the favorite filters are listed, the Preview Button (5703) which is used to load and run the favorite filter, the Ok Button (5701) which is used to approve the loaded filter, the Cancel Button (5702) which is used to cancel the loaded filter, and the Filter Settings Button (5704) which is used to open the Filter Settings Window (5800).

The Favorite Filters List lists the favorite filters that can be selected by the operator. Operator selects an appropriate favorite filter from the list (5705) and presses the Preview Button (5703) to run the filter. When the Preview Button (5703) is pressed, GUI starts recording and listening. If another filter is selected from the Favorite Filters List (5705) and then the Preview Button (5703) is pressed, GUI stops the ongoing recording and starts a new recording that is running with the newly selected filter.

When the Filter Settings Button (5704) is pressed, the Favorite Filters Window (5700) closes and the Filter Settings Window (5800) opens.

The Filter Settings Window (5800) is used to view and adjust the dual channel noise reduction filter (4114) parameters of second stage filtering (4132). Operator can change the filter or the filter parameters to achieve a better filtering performance. Any dual channel noise reduction filter (4114) type that is embedded to the system can be selected from the Filter Type List (5803).

The number of the corresponding filter's parameters and the parameter names change according to the selected filter type. Parameter changes are not applied instantly; operator should press the Preview Button (5804) to run the newly adjusted filter. When the Preview Button (5804) is pressed, GUI starts the recording and the target listening. If then another parameter is changed and the Preview Button (5804) is pressed, GUI stops the ongoing recording and starts a new recording that is running with the newly adjusted filter.

The Filter Settings Window (5800) also comprises the Pre/First/Post Filter Settings Button (5805), the Output Channel Button (5806), the Input Channel Button (5807), the Save to Favorite Filters Button (5808), the Ok Button (5801) and the Cancel Button (5802).

When the Pre/First/Post Filter Settings Button (5805) is pressed the Pre/First/Post Filter Selection Window (5900a) opens. The Pre/First/Post Filter Selection Window (5900a) comprises the Conventional Filters List which lists the Conventional Filters (4110 and 4111) of the Prefiltering Stage (4130), the First Stage Filters List which lists the Single Channel Noise Reduction Filters (4112 and 4113) of the First Stage Filtering (4131) and the Post Filter List which lists the Post Filter (4115) of the Second Stage Filtering (4132). Parameter adjustment required by the Post Filter (4115) of the Second Stage Filtering (4132) is performed via a slider button (5903a). Operator can select the filters that will be included to the process of the sound data, from the related filter lists. A selected filter starts to run immediately with no interruption to the recording.

The Output Channel Button (5806) and the Input Channel Button (5807) in the Filter Settings Window (5800) have the same functionality as the ones in the Settings Window (5504, 5505).

The Save to Favorite Filters Button (5808) is used to open the Save to Favorite Filters Window (6000). The Save to Favorite Filters Window (6000) is used to save the well performing filters to the Favorite Filters List. Operator then can load and run these filters by using The Favorite Filters Window (5700).

The Save to Favorite Filters Window (6000) comprises the Ok Button (6001), the Cancel Button (6002), the Home Button (6003) and the Favorite Filters Save List which is the list of the current Favorite Filters and empty slots where a Favorite Filter can be saved. Operator selects a place from the Favorite Filters Save List (6004) and presses the Ok Button (6001). When the Ok Button (6001) is pressed The Keyboard Window (6100) opens.

The Keyboard Window (6100) is used to enter the name of the Favorite Filter which will be shown in the Favorite Filters Window (5700). The Keyboard Window (6100) comprises the Keyboard Buttons (6103), the Ok Button (6101), the Cancel Button (6102) and the Word Button (6104). Operator presses the Keyboard Buttons (6103) to enter a name for the new Favorite Filter. When the Ok Button (6101) is pressed the new Favorite Filter is saved with the given name and the Main Window (5200) opens.

The Word Button (6104) is used to open the Word Keyboard Window (6200). The Word Keyboard Window (6200) contains the Word Buttons (6203) that state to words which are generally used while giving names to Favorite Filters. For example; "Big", "Small", "Room", "Thick", "Glass" etc. Operator can easily type these words by pressing to the corresponding button. The Word Keyboard Window (6200) also comprises a QWERTY Button (6201) and a Cancel Button (6202). When the QWERTY Button (6201) is pressed, the changes to the Favorite Filter name made in the Word Keyboard Window (6200) are approved and the Keyboard Window (6100) opens.

When the Home Button (6003) in the Save to Favorite Filters Window (6000) is pressed, the save process and all the changes made in the previous Filter Settings Window (5800) and Favorite Filters Window (5700) are canceled and the Main Window (5200) opens, so the operator can easily cancel all the changes and return to the Main Window (5200). Pressing the Home Button (6003) has the same effect of pressing the Cancel Buttons (6002, 5802 and 5702) of the Save to Favorite Filters Window (6000), the Filter Settings Window (5800) and the Favorite Filters Window (5700), respectively.

While the foregoing is directed to embodiments of the present invention, other and further embodiments of the invention may be conceived without departing from the basic scope thereof, and the scope thereof is determined by the claims that follow.

What is claimed is:

1. A dual-channel laser audio monitoring system for an interferometric vibration measurement on a shiny reflecting surface ora retro-reflecting surface, comprising:
   a transducer unit,
   a control unit,
   a supporting system,
   an interface cable, and
   a plurality of speakers and/or a plurality of stereo headphones;
   wherein the transducer unit is placed on the supporting system, the interface cable is connected between the transducer unit and the control unit, the plurality of speakers and/or the plurality of stereo headphones are configured to output a plurality of filtered channel signals;
   the transducer unit comprises an optical module, a linear guide, a bellows and a signal level detection and indication block; the optical module is placed inside the transducer unit and comprises a plurality of photodetectors, each of the plurality of photodetectors outputs a plurality of analog signals, the linear guide is configured to adjust an interval between two beam expander lens assemblies, the bellows is arranged between the two beam expander lens assemblies, the signal level detection and indication block is configured to operate on the plurality of analog signals;
   the control unit comprises a demodulator, an automatic volume control block, a graphical user interface and a plurality of digital filters; the demodulator comprises a demodulation block, the demodulation block operates on the plurality of analog signals and outputs a plurality of demodulated audio signals; the automatic volume control block operates on the plurality of demodulated audio signals and outputs a plurality of unclipped audio signals; the graphical user interface is configured to control operations of the dual-channel laser audio monitoring system; each of the plurality of digital filters comprises a filtering module, the filtering module operates on a plurality of two-channel signals and outputs the plurality of filtered channel signals; the plurality of two-channel signal is digitized versions of the plurality of unclipped audio signals.

2. The dual-channel laser audio monitoring system according to claim 1, wherein the transducer unit comprises a plurality of telescopes, each of the plurality of telescopes is located over each probe beam exit.

3. The dual-channel laser audio monitoring system according to claim 1, wherein the optical module is placed inside the transducer unit, the optical module comprises
   a laser as a radiation source for generating an original beam,
   a collimator,
   a mirror,
   a half-wave plate (HWP),
   a first polarizing beam splitter (PBS) for dividing the original beam into a probe beam and a reference beam,
   a first non-polarizing beam splitter (NPBS) for splitting the probe beam into two parallel probe beams,
   a plurality of additional mirrors,
   a plurality of second polarizing beam splitters (PBS) for the two parallel probe beams,
   a plurality of quarter wave plates (QWP) for the two parallel probe beams,
   a beam expander lens system,
   one or more Bragg cells,
   a plurality of third non-polarizing beam splitters,
   a mirror, and
   a plurality of photodetectors.

4. The dual-channel laser audio monitoring system according to claim 3, wherein the laser is a single continuous-wave fiber laser, the single continuous-wave fiber laser produces an ultra-narrow line-width beam having a wavelength of 1550 nm.

5. The dual-channel laser audio monitoring system according to claim 3, wherein the optical module is an interferometer system, the optic module comprises
   the first polarizing beam splitter and the plurality of second polarizing beam splitters, the first non-polarizing beam splitter and a plurality of second non-polarizing beam splitters and the plurality of quarter-wave plates, a vertically adjustable mirror and the plurality of second-non-polarizing beam splitters and the plurality of third non-polarizing beam splitters;
   one of the two parallel probe beams, a back-reflected probe beam and the reference beam are coaxial and all spatially overlap on one of the plurality of photodetectors.

6. The dual-channel laser audio monitoring system according to claim 1, wherein the control unit further comprises
   a USB port,
   a battery,
   a plurality of control and DSP processors,
   a data storage device, and
   a line out interface.

7. The dual-channel laser audio monitoring system according to claim 1, wherein the supporting system comprises a tripod, a plurality of adjustable plates and a plurality of shock absorbers.

8. The dual-channel laser audio monitoring system according to claim 7, wherein the tripod comprises a pan and a plurality of tilt handles.

9. The dual-channel laser audio monitoring system according to claim 7, wherein a right lens is placed on one of the plurality of adjustable plates.

10. The dual-channel laser audio monitoring system according to claim 1, wherein the interface cable comprises a plurality of multi-voltage power lines, which each multi-voltage power line carries a modulating radio frequency (RF) signal to a Bragg Cell, the Bragg Cell is installed within the optical module inside the transducer unit, and the each multi-voltage power line carries the plurality of analog signals, the plurality of analog signals are a plurality of dual-channel radio frequency (RF) signals to the demodulator, the demodulator is located inside the control unit.

11. The dual-Dual channel laser audio monitoring system according to claim 1, wherein the demodulation block comprises a mixer block, a bandpass filter, a demodulator block, a local oscillator and an analog bandpass filter.

12. The dual-channel laser audio monitoring system according to claim 1, wherein the filtering module comprises a prefiltering stage, a first stage filtering and a second stage filtering.

13. The dual-channel laser audio monitoring system according to claim 1, wherein the filtering module provides two-channel simultaneous listening with simultaneous signals, the filtering module conveys a phase information depending on the interval between the two beam expander lens assemblies.

14. The dual-channel laser audio monitoring system according to claim 12, wherein the prefiltering stage comprises a conventional filters block having a unity filter and two conventional digital high-pass filters with two different cut-off frequencies.

15. The dual-channel laser audio monitoring system according to claim 12, wherein the first stage filtering comprises a single channel noise reduction blocks, the single channel noise reduction block comprises a unity filter, a frequency response compensator and a two-stage noise reduction (TSNR) filter, the first stage filtering is applied to input signals depending on an operator's choice.

16. The dual-channel laser audio monitoring system according to claim 12, wherein the second stage filtering comprises a dual channel noise reduction block having a conventional ANC (adaptive noise canceller), a CTR-ANC (crosstalk resistant adaptive noise canceller comprising its asymmetric variant), a cross empirical Wiener filter, and an empirical Wiener filter as a post filter.

17. The dual-channel laser audio monitoring system according to claim 1, wherein the graphical user interface (GUI) of the control unit comprises a lock screen.

18. The dual-channel laser audio monitoring system according to claim 17, wherein the lock screen is an image, the image is loaded from a file, the lock screen comprises invisible buttons, the invisible buttons are placed at designated locations on the GUI.

19. The dual-channel laser audio monitoring system according to claim 18, wherein the invisible buttons are used to exit from the lock screen when they the invisible buttons are pressed with a right predetermined sequence.

20. The dual-channel laser audio monitoring system according to claim 1, wherein the filtering module is configured to apply filtering methods, the filtering methods are applied to a user selected single channel or to two channels separately or to two channels simultaneously to cope with noise interfering to speech signals under measurement.

21. The dual-channel laser audio monitoring system according to claim 20, wherein the filtering methods include
a first method for removing a low frequency background noise comprising two high pass IIR (Infinite Impulse Response) filters with each different cut-off frequency customized in accordance to a low-end frequency of a speech signal and a high-end frequency of likely background noise;
a second method for compensating both transfer functions of a vibrating material and an analog demodulator stage, comprising two combined inverse functions, with one analytically derived and normalized from material properties of vibrating object/glass, and the other measured and normalized from frequency deviation versus output level curve of the demodulation block;
a third method for reducing noise in a single channel taking into account that one of the channels may not be available in some practical applications, comprising
considering only a single channel observation is available,
extracting noise and voice signal information from the user selected single channel,
estimating a short-time spectral gain depending on a signal-to-noise ratio, evaluating initial noise variance by assuming a very beginning short period of channel signal consists of noise only;
a fourth method for cancelling a noise signal emerging from another source and impinging on both a first optical channel and a second optical channel, comprising
retrieving a first optical channel signal as a primary input and a second optical channel signal as a reference input,
estimating the transfer function from a noise source to the primary input using NLMS (Normalized Least Mean Square) algorithm,
filtering the primary input utilizing the reference input to get a noise free output;
a fifth method for noise and speech signal separation utilizing both the first optical channel and the second optical channel, and at least de-correlating signals at the outputs of the module, comprising
retrieving a first optical channel signal as a primary input and a second optical channel signal as a reference input,
estimating two cross transfer functions, with one cross transfer function from a noise source to the primary input and the other cross transfer function from a speech source to the reference input, utilizing at least LMS (Least Mean Square) and NLMS (Normalized Least Mean Square) algorithms,
selecting one of the LMS algorithm and the NLMS algorithm via a user interface in accordance to a signal separation performance perceived at the output and to a convergence status prompted on the user interface,
utilizing an adjunct parameter representing a physical distance between two optical channels to put a null at a direction of the noise source to further increase the noise separation and canceling compared to other selections,
filtering the primary input and the reference input using estimated two cross transfer functions at least to get versions of original speech and original noise signals at outputs of the module;
a sixth method for denoising, the sixth method utilizes a user selected channel as a means to design an empirical Wiener filter while using the other channel for an application, comprising
taking into account both channel signals simultaneously,
assigning a user preferred channel as a mostly noise free voice signal and leveraging the mostly noise free voice signal into a design of the empirical Wiener filter,
letting the user to control, change and input a noise variance value to the empirical Wiener filter via a slider button on the graphical user interface screen during operation of the apparatus;

a seventh method for post filtering of an output signal for further noise reduction, comprising
    leveraging a denoised output signal into the design of the empirical Wiener filter while taking a relevant input channel for an application,
    letting the user to control, change and input the noise variance value to the empirical Wiener filter via a slider button on the graphical user interface screen during operation of the apparatus;
wherein the filtering methods in the filtering module are accessible at three stages of a prefiltering stage, a first stage filtering and a second stage filtering, the three stages are applied sequentially, or in a combined manner, or individually, but, separately, to input conventional filters blocks, single channel noise reduction blocks, dual channel noise reduction block, post filtering step.

* * * * *